US012328207B2

(12) United States Patent
Penna et al.

(10) Patent No.: US 12,328,207 B2
(45) Date of Patent: Jun. 10, 2025

(54) ITERATIVE CHANNEL ESTIMATION FOR NEW RADIO (NR)

(71) Applicant: Samsung Electronics Co., Ltd., Suwon-si (KR)

(72) Inventors: Federico Penna, San Diego, CA (US); Sili Lu, San Diego, CA (US); Yuansheng Cheng, San Diego, CA (US); Jang Wook Moon, San Diego, CA (US); Jung Hyun Bae, San Diego, CA (US); Dongwoon Bai, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 52 days.

(21) Appl. No.: 18/136,863

(22) Filed: Apr. 19, 2023

(65) Prior Publication Data

US 2024/0259236 A1 Aug. 1, 2024

Related U.S. Application Data

(60) Provisional application No. 63/439,857, filed on Jan. 18, 2023.

(51) Int. Cl.
*H04L 25/02* (2006.01)
*H04L 27/26* (2006.01)

(52) U.S. Cl.
CPC ........ *H04L 25/024* (2013.01); *H04L 27/2601* (2013.01)

(58) Field of Classification Search
CPC ............... H04L 25/0202; H04L 25/024; H04L 27/2601; H04L 27/2695
See application file for complete search history.

(56) References Cited

U.S. PATENT DOCUMENTS

| | | | | |
|---|---|---|---|---|
| 8,488,690 | B2 * | 7/2013 | Carbonelli | H04L 25/0232 375/267 |
| 9,537,678 | B2 | 1/2017 | Lee et al. | |
| 10,447,447 | B2 | 10/2019 | Namgoong et al. | |
| 11,310,020 | B2 | 4/2022 | Kim et al. | |
| 2014/0105333 | A1 * | 4/2014 | Kim | H04L 25/0204 375/341 |

(Continued)

*Primary Examiner* — David B Lugo
(74) *Attorney, Agent, or Firm* — Renaissance IP Law Group LLP

(57) ABSTRACT

A method and system include a symbol processing block to generate log likelihood ratios (LLRs) associated with one or more data symbols. The method and system include a channel estimation (CE) module to receive the LLRs from the symbol processing block, and to process iterative CE (ItCE) for new radio (NR) based at least on reference signals and the LLRs. The CE module can process the ItCE with a granularity of one or more resource blocks (RBs) based at least on pilot resource elements (REs) and virtual pilot REs obtained from the LLRs. The CE module can process the ItCE based at least on a frequency domain orthogonal cover codes (FD-OCC) structure of the reference signals. The reference signals can be demodulation reference signals (DMRS) configured in 5G NR. The CE module can process the ItCE by updating a CE result by adding a quantity that represents a contribution obtained from virtual pilot REs.

19 Claims, 29 Drawing Sheets

DATA RE OBSERVATIONS 107
165 RBs / RB GRANULARITY
100
SYMBOL PROCESSING BLOCK 112
155 DMRS REs
ITERATIVE DETECTION AND DECODING 115
130 CHANNEL ESTIMATION (CE) MODULE 150 175
105 110
170
SYMBDET MODULE 125 120 SYMBDEC MODULE
135 A POSTERIORI LLR(s)
DATA FEEDBACK / VIRTUAL PILOT REs 160
PILOT AND/OR VIRTUAL PILOT RE OBSERVATIONS 145

(56) References Cited

U.S. PATENT DOCUMENTS

| | | | | |
|---|---|---|---|---|
| 2017/0203624 | A1 | 7/2017 | Mielke et al. | |
| 2018/0019774 | A1* | 1/2018 | Hampel | H04L 25/03012 |
| 2018/0294997 | A1* | 10/2018 | Lee | H04L 25/0204 |
| 2020/0153664 | A1* | 5/2020 | Penna | H04J 13/0003 |
| 2020/0204290 | A1* | 6/2020 | Caretti | H03M 13/6525 |
| 2020/0396575 | A1* | 12/2020 | Kim | G06N 3/04 |
| 2021/0135789 | A1 | 5/2021 | Wu et al. | |
| 2023/0412447 | A1* | 12/2023 | Chen | H04L 27/2647 |
| 2024/0275556 | A1* | 8/2024 | Chen | H04L 5/0051 |

* cited by examiner

= PILOT (DMRS) RE 155

= FEEDBACK DATA RE 160

= INTERPOLATED CE IN FREQUENCY DOMAIN 605

= INTERPOLATED DRMS PILOT IN FREQUENCY DOMAIN 610

= ADDITIONAL OUTPUT 2415

= INTERPOLATED ADDITIONAL OUTPUT IN FREQUENCY DOMAIN 2420

= DRMS PILOT AND LtCE VIRTUAL PILOT IN TIME DOMAIN 615

ITERATIVE CHANNEL ESTIMATION FOR NEW RADIO (NR)

CROSS-REFERENCE TO RELATED APPLICATION

This application claims the priority benefit under 35 U.S.C. § 119(e) of U.S. Provisional Application No. 63/439,857, filed on Jan. 18, 2023, the disclosure of which is incorporated by reference in its entirety as if fully set forth herein.

TECHNICAL FIELD

The disclosure generally relates to New Radio (NR) (5G) receiver operation. More particularly, the subject matter disclosed herein relates to iterative channel estimation (ItCE) techniques to achieve improved gains.

SUMMARY

Channel estimation (CE) can be a key step in the NR receiver operation. In orthogonal frequency-division multiplexing (OFDM) systems, CE is typically performed with the aid of pilot symbols or "reference signals" sent by a base station (e.g., gNB in NR) at predefined locations (e.g., resource elements or REs) of an OFDM grid. For example, in NR, such pilots are called demodulation reference signals (DMRS). In NR Physical Downlink Shared Channel (PDSCH), a channel can be estimated based on DMRS. Conventionally, pilot-based CE can interpolate the channel estimation at DMRS resource element (RE) locations to compute CE at data REs (e.g., PDSCH). And the estimated channel can be used for the following detecting and decoding procedure.

Iterative channel estimation (ItCE) can include a technique that aims at enhancing the performance of conventional pilot-based CE, by exploiting symbol detector and/or decoder output (e.g., a posteriori log likelihood ratios, or LLRs) to create "virtual pilots" on a subset of data (e.g., PDSCH) REs. Specifically, ItCE can include two or more iterations: in the first iteration, regular pilot-based CE can be applied, followed by symbol detection and decoding; then, in the subsequent iteration(s), CE can be applied again using LLR feedback, and a new round of detection and decoding can be performed given the updated channel estimates.

In some embodiments disclosed herein, an ItCE technique can be derived for NR, taking into account a frequency domain orthogonal cover codes (FD-OCC) structure of NR DMRS. Some embodiments can include four candidate ItCE techniques, designed to have low complexity especially in terms of matrix inversion and matrix computations. Multiple parameters can be evaluated and optimized for the technique, leading to design guidelines for ItCE implementation. Under an environment where ItCE is used in combination with iterative detection and decoding (IDD), the low-complexity ItCE techniques disclosed herein can achieve gains within 1 decibel (dB) (e.g., 0.5 dB) compared to pilot CE with IDD in a moderate channel. It will be understood that the gain can be much larger (e.g., gains of several dB) in an aggressive channel, frequency range 2 (FR2) and/or with challenging DMRS patterns. Moderate and aggressive channels can be characterized by medium and high delay spread, respectively, and medium and high Doppler frequency, respectively. Gains can be defined as signal-to-noise-ratio (SNR) gains at 10% block error rate (BLER).

In some embodiments, a method and system include a symbol processing block to generate LLRs associated with one or more data symbols. The method and system include a CE module to receive the LLRs from the symbol processing block, and to process ItCE for NR based at least on reference signals and the LLRs. The CE module can process the ItCE with a granularity of one or more resource blocks (RBs) based at least on pilot REs and virtual pilot REs obtained from the LLRs. The CE module can process the ItCE based at least on an FD-OCC structure of the reference signals. The reference signals can be DMRS configured in 5G NR. The CE module can process the ItCE by updating a CE result by adding a quantity that represents a contribution obtained from the virtual pilot REs.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
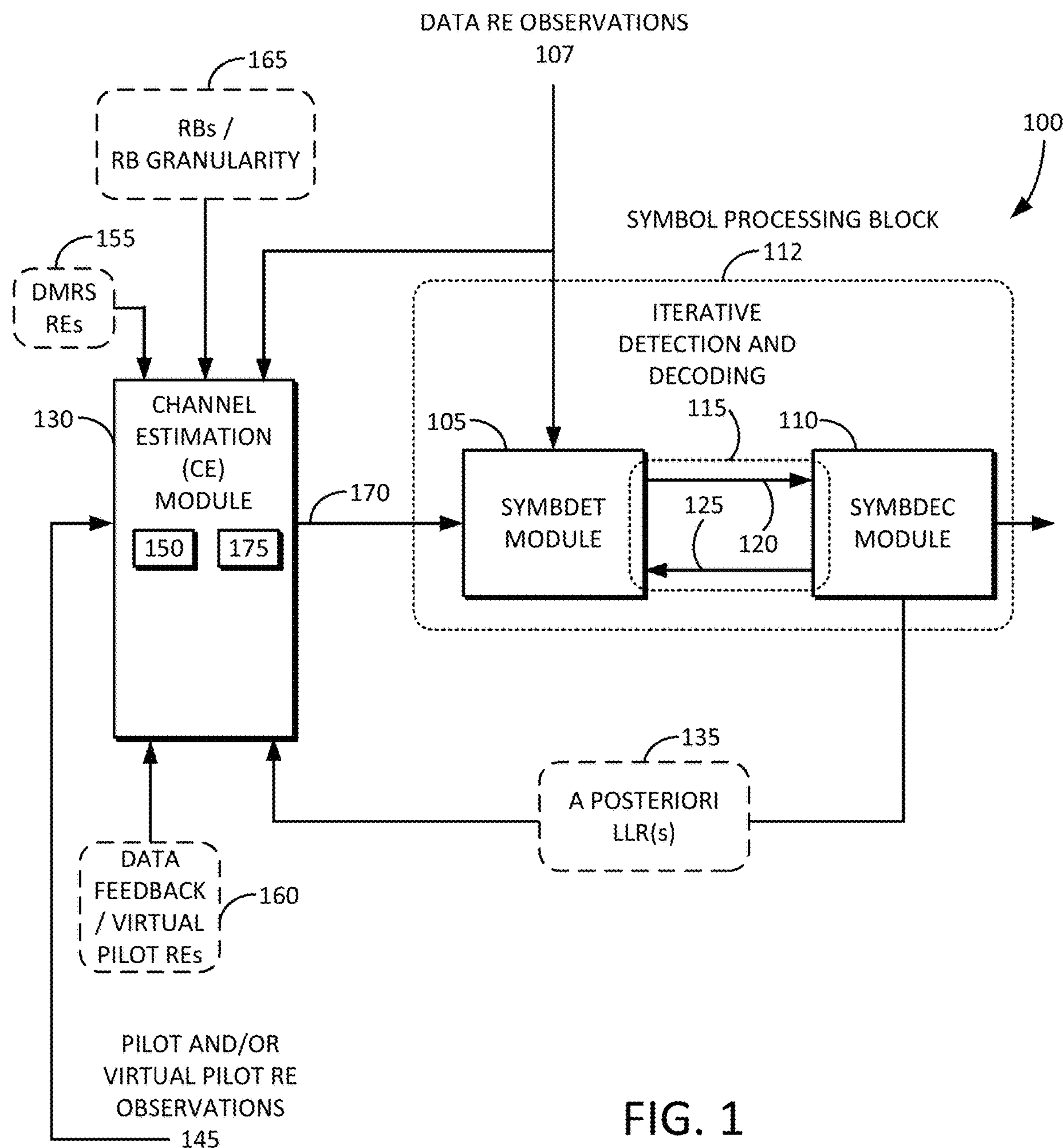
FIG. 1 shows an example block diagram of an ItCE system according to some embodiments disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In some embodiments disclosed herein, an ItCE technique can be derived for NR as set forth in equation (1) below. A primary difference in NR (5G) compared to LTE (4G) is the presence of FD-OCC in DMRS, which can lead to different expressions of Minimum Mean Square Error (MMSE)/Expectation Maximization (EM) maximum a posteriori (MAP) (EM-MAP) filters.

In some embodiments disclosed herein, four low-complexity ItCE techniques for NR can be provided, designed so that the number of taps for matrix inversion does not exceed a predefined number (e.g., 12). These techniques can share the same feedback data pattern, but can be characterized by different numbers of output REs and interpolation options. In some embodiments disclosed herein, a sequential soft-interference cancellation (sequential SIC) method can be provided to improve the iterative CE in multiple layer cases. In some embodiments disclosed herein, low complexity ItCE techniques can be targeted for FR-2, and can provide one or more methods for dealing with phase noise.

ItCE can include a technique that enhances the performance of conventional pilot-based CE, by exploiting decoder output (e.g., a posteriori LLRs) to create "virtual pilots" on a subset of data REs. ItCE can include an "add-on" functionality on top of the existing IDD architecture if IDD is already available in an LTE and/or NR modem. While in IDD, the LLRs can be passed from the decoder back to a symbol detector. In ItCE, the LLRs can be passed to a CE block as well.

FIG. 1 shows an example block diagram of an ItCE system 100 according to some embodiments disclosed herein. The ItCE system 100 can include a SymbDet (i.e., symbol detector) module 105 and a SymbDec (i.e., symbol decoder) module 110. The SymbDet module 105 can receive data RE observations 107. A symbol processing block 112 can include IDD 115, which can include extrinsic LLR 120 from the SymbDet module 105 to the SymbDec module 110. The IDD 115 can include extrinsic a posteriori LLR 125 from the SymbDec module 110 to the SymbDet module 105. ItCE can be applied independent of the IDD 115, i.e., in an iteration, the SymbDet module 105 need not take the extrinsic or a posteriori LLR(s) 125 from the SymbDec module 110—rather, a CE module 130 can update a channel estimate. The CE module 130 can receive a posteriori LLR 135 directly from the SymbDec module 110. The CE module 130 can receive data RE observations 107 and/or pilot and virtual pilot RE observations 145. Conventionally, the CE module 130 does not receive the data RE observations 107 or virtual pilot REs 160.

The CE module 130 can process an RB bundle 150, comprising $N_{RB}$ one or more RBs 165. A processing granularity of the ItCE system 100 can be one or more RBs 165 (e.g., RB granularity). The ItCE system 100 can include one or more RB bundles 150 having the one or more RBs 165. The term "RB bundle" can have the same meaning of "processing granularity" as used herein. Put differently, the processing granularity is the number of RBs that can be processed jointly. Let $N_P$ be the number of pilot (e.g., DMRS) REs 155 within the RB bundle 150 and $N_D$ be the number of data feedback REs 160 (e.g., the "virtual pilot REs 160" obtained by the LLR feedback 135 from the SymbDec module 110) within the considered RB bundle 150. Let $y^{pilot} \in \mathbb{C}^{N_P \times 1}$ be the vector of received signal on pilot REs 145 and $y^{data} \in \mathbb{C}^{N_D \times 1}$ the vector of received signal on the virtual pilot REs 160. Then, the received signal on all (pilot and virtual pilot) REs can be:

$$y = \begin{bmatrix} y^{pilot} \\ y^{data} \end{bmatrix} = \begin{bmatrix} C_0 p_0 + C_1 p_1 \\ X_l d_l \end{bmatrix} + z \tag{1}$$

where the $N_P \times N_P$ matrices $C_0=\text{diag}([1, 1, \ldots, 1, 1])$ and $C_1=\text{diag}([1, -1, \ldots, 1, -1])$ represent the FD-OCC sequences for two layers in a code division multiplexing (CDM) group; $p_j \in \mathbb{C}^{N_P \times 1}$ is the channel vector for layer $j \in \{0,1\}$ on pilot REs; $X_l \in \mathbb{C}^{N_D \times N_D}$ is a diagonal matrix containing the data feedback on virtual pilot REs; $d_l \in \mathbb{C}^{N_D \times 1}$ is the channel vector for layer l on virtual pilot REs; and $z \in \mathbb{C}^{(N_P+N_D) \times 1}$ is additive Gaussian noise.

This technique can be used in the field of wireless communication, and can represent an expression for the signal y, which can be used to generate an output 170 of the CE module 130. The signal y can be an observed (e.g., received) signal on pilot (e.g., 145) and virtual REs (e.g., 160), which can be used as input to ItCE. The signal y can be a combination of two different types of signal components: the pilot signal $y^{pilot}$ and the data signal $y^{data}$. The pilot signal $y^{pilot}$ includes the matrices $C_0$ and $C_1$, which can be diagonal matrices used to represent the FD-OCC sequences for two layers in a CDM group. The pilot signal $y^{pilot}$ includes the vectors $p_0$ and $p_1$, respectively, on pilot REs. The data signal $y^{data}$ can be represented by a diagonal matrix $X_l$ and a vector $d_1$ both of which can contain information about the data feedback on the virtual pilot REs 160. The technique can include a term for additive Gaussian noise, represented by the vector z, which can affect the overall signal y. The CE module 130 can process the received inputs, and generate the estimated channel on line 170. This technique can provide an output signal (i.e., estimated channel) 170 from the CE module 130, which can be based on the pilot signal and data signal, both of which can be affected by the channel conditions and the additive Gaussian noise. The output 170 of the CE module 130 is the estimated channel $\hat{h}$. Specifically, for CE, the output 170 is $\hat{h}_{pilot}$ as shown in Eq. (11), and for ItCE, the output 170 is $\hat{h}^{MMSE}$, etc., as shown in Eq. (4), (6), and (7), for example.

Figure 2:
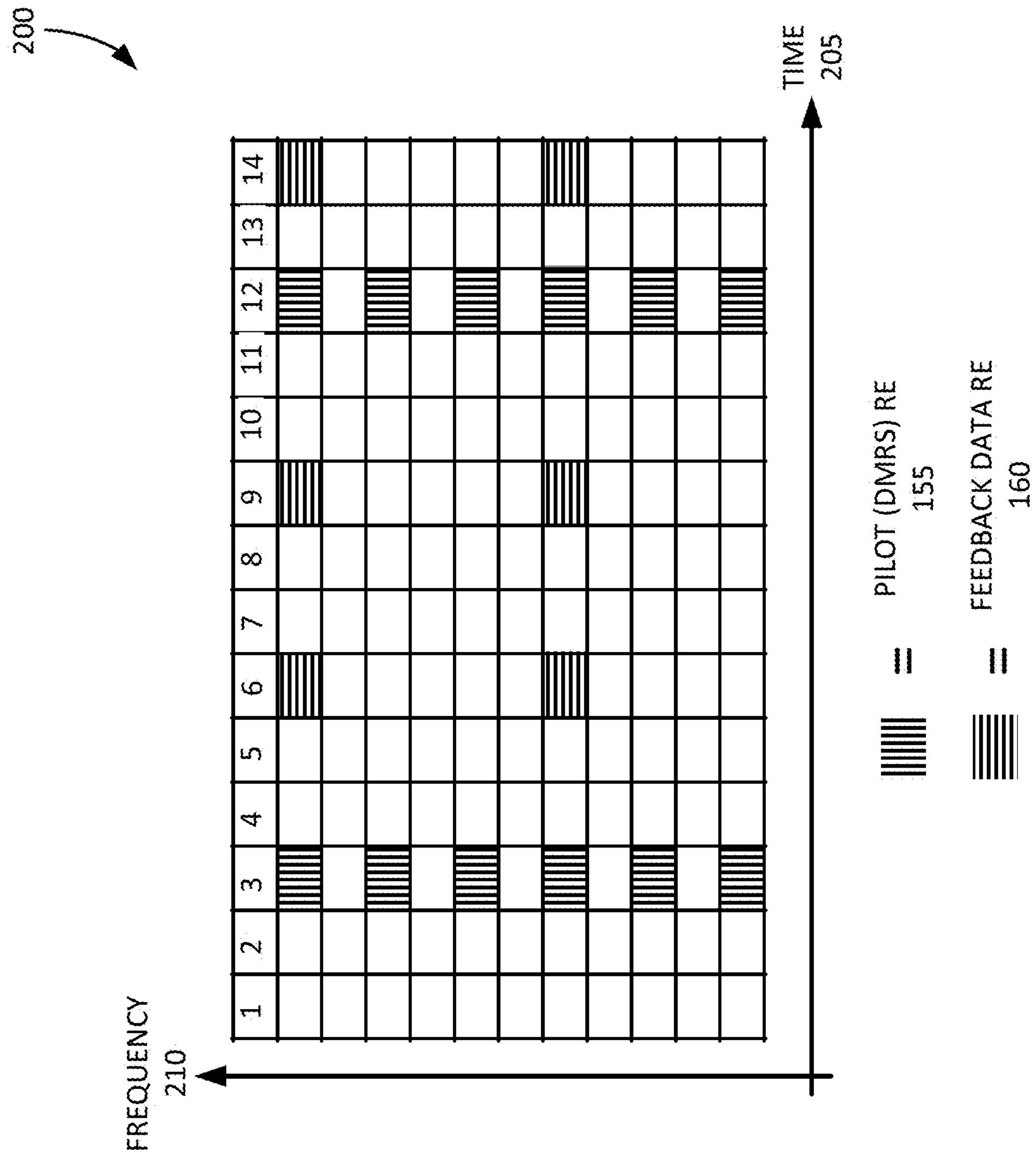
FIG. 2 is an example time-frequency diagram showing an RE data feedback pattern in accordance with some embodiments disclosed herein.

FIG. 2 is an example time-frequency diagram 200 showing an RE data feedback pattern in accordance with some embodiments disclosed herein. An X-axis 205 represents time and a Y-axis 210 represents frequency. Sections of the diagram 200 that include horizontal lines represent pilot (DMRS) REs 155, which can be known information. Sections of the diagram 200 that include vertical lines represent feedback data REs 160. Each block within the diagram 200 can represent an RE, which in turn can represent an information payload (e.g., data or pilot symbols). In NR's frame structure, a slot is equivalent to 14 symbols for normal cyclic prefix (CP) regardless of subcarrier spacing (SCS). The information payloads can be different based on their frequency, for example, Internet, data, voice, etc. NR DMRS can use FD-OCC to share the pilot REs 155 between layers. The pilot REs 155 shown in FIG. 2 can be based on NR type-1 DMRS with two single DMRS symbols. The pilot REs 155 can correspond to the $y^{pilot}$ of equation (1) above, and the feedback data REs 160 can correspond to the $y^{data}$ of equation (1) above. A received signal can be modeled on the pilot REs 155 $y^{pilot}$ with structure of FD-OCC. In this example, it is assumed that only one layer of data is present, a layer index of which can be denoted by l in equation (1) above, which can be the same index of the channel $h_l$ to be estimated.

In the above technique, it is assumed that one layer of data is present. This layer index can be denoted by l, which can be the same index of the channel $h_l$ to be estimated.

Some embodiments disclosed herein include a data-aided iterative CE technique based on NR PDSCH with single data layer, derived without de-spreading FD-OCC in DMRS. Examples of such embodiments include: data-aided MMSE, data-aided soft-MMSE, and data-aided EM-MAP.

Under Gaussian zero-mean assumption, the following equations (2) and (3) can apply:

$$R_{h_l y} = \begin{bmatrix} R_{h_l p_0} C_0 + R_{h_l p_1} C_1 & R_{h_l d} X_l^h \end{bmatrix} = \begin{bmatrix} R_{hp} C_l & R_{hd} X_l^H \end{bmatrix} \tag{2}$$

$$R_{yy} = \begin{bmatrix} C_0 R_{pp} C_0 + C_1 R_{pp} C_1 & C_l R_{pd} X_l^H \\ X_l R_{dp} C_l & X_l R_{dd} X_l^H \end{bmatrix} + \sigma^2 I \tag{3}$$

which can have the following properties:

a) Channels for different layers can be uncorrelated, i.e., $R_{h_l p_k}=0$ as well as $R_{h_l d_k}=0$ for $k \neq l$. b) To simplify notation, since the channel for different layers can occupy the same REs, index l in $R_{pp}$, $R_{pd}$, $R_{hp}$, $R_{hd}$, $R_{dp}$, $R_{dd}$ can be dropped. Whenever not explicitly indicated, the layer index can be assumed to be 1 (i.e., the same of the channel to be estimated). c) $C_l^H=C_l$ because it can be a real diagonal matrix.

Then, the following equations (4) and (5) can apply:

$$\hat{h}_l^{MMSE} = \mathbb{E}_{X_l|y}\left[\begin{bmatrix} R_{hp}C_l & R_{hd}X_l^H \end{bmatrix}\left(\begin{bmatrix} C_0R_{pp}C_0 + C_1R_{pp}C_1 & C_lR_{pd}X_l^H \\ X_lR_{dp}C_l & X_lR_{dd}X_l^H \end{bmatrix} + \sigma^2 I\right)^{-1}\right]y \tag{4}$$

$$= \begin{bmatrix} R_{hp}C_l & R_{hd} \end{bmatrix}\mathbb{E}_{X_l|y}\left[\left(\begin{bmatrix} C_0R_{PP}C_0 + C_1R_{PP}C_1 & C_lR_{pd} \\ R_{dp}C_l & R_{dd} \end{bmatrix} + \sigma^2\begin{bmatrix} I & 0 \\ 0 & (X_l^HX_l)^{-1} \end{bmatrix}\right)^{-1}\begin{bmatrix} I & 0 \\ 0 & X_l^{-1} \end{bmatrix}\right]y \tag{5}$$

It will be understood that, in the latter expression, $X_l$ is invertible because it is a diagonal matrix. The MMSE expression of (5) can be complex because the matrix inversions $(X_l^HX_l)^{-1}$ and $X_l^{-1}$ can be computed for each possible value of $X_l$ before taking the expectation. To simplify the expression, the order of expectation and inversion can be reversed. The resulting expression can be interpreted as a "soft MMSE" estimator, because $\mathbb{E}_{X_l|y}[X_l]$ and $\mathbb{E}_{X_l|y}[X_l^HX_l]$ represent respectively the "soft mean" and the "soft variance" of the feedback data symbols:

$$\hat{h}_l^{soft-MMSE} = \begin{bmatrix} R_{hp}C_l & R_{hd} \end{bmatrix}\left[\left(\begin{bmatrix} C_0R_{pp}C_0 + C_1R_{pp}C_1 & C_lR_{pd} \\ R_{dp}C_l & R_{dd} \end{bmatrix} + \sigma^2\begin{bmatrix} I & 0 \\ 0 & \left(\mathbb{E}_{X_l|y}[X_l^HX_l]\right)^{-1} \end{bmatrix}\right)^{-1}\begin{bmatrix} I & 0 \\ 0 & \left(\mathbb{E}_{X_l|y}[X_l]\right)^{-1} \end{bmatrix}\right]y. \tag{6}$$

A remaining source of complexity in the soft MMSE expression (6) can be the expectation $\mathbb{E}_{X_l|y}$. An iterative solution can be used to approximate $\mathbb{E}_{X_l|y} \approx \mathbb{E}_{X_l|\hat{d}_l,y}$, where $\hat{d}_l$ is the channel estimate obtained in the previous iteration. This can be interpreted as an EM-MAP estimator. A practical way to compute the conditional expectation $\mathbb{E}_{X_l|\hat{d}_l,y}$ is by using "a posteriori probabilities" (APPs) obtained from the LLRs 135 at the output of the decoder 110.

In summary, the iterative EM-MAP solution at iteration (i+1) can be written as:

$$\hat{h}_l^{EM-MAP(i+1)} = \begin{bmatrix} R_{hp}C_l & R_{hd} \end{bmatrix}\left[\left(\begin{bmatrix} C_0R_{pp}C_0 + C_lR_{pp}C_l & C_lR_{pd} \\ R_{dp}C_l & R_{dd} \end{bmatrix} + \sigma^2\begin{bmatrix} I & 0 \\ 0 & \left(\sum_l^{(i)}\right)^{-1} \end{bmatrix}\right)^{-1}\begin{bmatrix} I & 0 \\ 0 & \left(\sum_l^{(i)}\right)^{-1}\left(M_l^{(i)}\right)^H \end{bmatrix}\right]y \tag{7}$$

where the diagonal matrices can be defined as:

$$\sum_l^{(i)} \overset{def}{=} E_{X_l|\hat{d}_l^{EM-MAP(i)},y}\left[X_l^HX_l\right] \tag{8}$$

$$M_l^{(i)} \overset{def}{=} E_{X_l|\hat{d}_l^{EM-MAP(i)},y}[X_l] \tag{9}$$

In the above equations, vector $\hat{d}_l^{EM-MAP(i)} \in \mathbb{C}^{N_D \times 1}$ can denote estimated channels at iteration i on the REs corresponding to data feedback (e.g., virtual pilot REs 160). It will be understood that the output $\hat{h}_l^{EM-MAP(i+1)}$ of (7) may refer to any RE, including the virtual pilot REs $\hat{d}_l^{EM-MAP(i+1)}$. For the initial channel estimate $\hat{d}_l^{EM-MAP(0)}$, the output of pilot-based CE on the virtual pilot REs can be taken.

In summary, the ItCE formula with FD-OCC expression is set forth as equation (5) above. Equation (5) can be approximated to soft-MMSE form by taking the expectation on $(X_l^HX_l)^{-1}$ and $X_l^{-1}$ as shown in equation (6). Soft-MMSE form can be further approximated by assuming $\mathbb{E}_{X_l|y} \approx \mathbb{E}_{X_l|\hat{d}_l,y}$, where $d_l$ is the channel estimate obtained in the previous iteration. And the conditional expectation $\mathbb{E}_{X_l|\hat{d}_l,y}$ is by using the APPs obtained from the LLRs 135 at the output of the decoder 110. The resulting ItCE formula can be called by "data-aided EM-MAP" and can be expressed by equations (7)-(10).

Expression (7) can be further simplified into a sequential form as follows:

$$\hat{h}_l^{EM-MAP(i+1)} = \hat{h}_l^{pilot} + \tilde{R}_{hd}\left(\tilde{R}_{dd} + \sigma^2\left(\sum_l^{(i)}\right)^{-1}\right)^{-1}\left(\left(\sum_l^{(i)}\right)^{-1}\left(M_l^{(i)}\right)^H y^{data} - \hat{d}_l^{pilot}\right) \tag{10}$$

$$\hat{h}_l^{pilot} \overset{def}{=} W_{hp}y^{pilot}, \tag{11}$$

$$W_{hp} \overset{def}{=} R_{hp}C_lP^{-1}, \tag{12}$$

$$\tilde{R}_{hd} \overset{def}{=} R_{hd} - W_{hp}C_lR_{pd} \tag{13}$$

$$\tilde{R}_{dd} = R_{dd} - W_{dp}C_lR_{pd} \tag{14}$$

$$W_{dp} \overset{def}{=} R_{dp}C_lP^{-1}, \tag{15}$$

$$\hat{d}_l^{pilot} = W_{dp}y^{pilot} \tag{16}$$

It will be understood that the equation (10) is simpler than the equation (7) for at least two reasons: a) The matrix inverse size can be reduced to $N_D \times N_D$, instead of $(N_P+N_D) \times (N_P+N_D)$ of the original expression; and b) The sequential form (10) can reuse the output of pilot-based CE $\hat{h}_l^{pilot}$ and just update it according to the data feedback. The CE module 130 can process the received inputs, and generate the output signal on line 170. For example, the CE module 130 can process $\hat{h}_l^{pilot}$ and can output $\hat{h}_l^{EM-MAP(i+1)}$ on the output line 170.

Some embodiments disclosed herein include a data-aided EM-MAP having sequential filtering: the sequential form of data aided EM-MAP (i.e., equation (7)) can be derived (i.e., equation (10)). The sequential form (i.e., equation (10)) can be equivalent to the non-sequential form (i.e., equation (7)) but with less complexity.

The equation (10) can be optimal in the sense that all the inputs and parameters can be based on the assumptions in the model disclosed herein. Sometimes, model mismatches can be experienced in some scenarios, for example, in complex reduction techniques as described below. In these scenarios, the EM-MAP can be treated with sequential filtering and an updating process for the $h_l$. Since the updating term may be over-estimated or under-estimated due to model misfits, an additional scaling factor β can be used in the updating term for further optimization, such that:

$$\hat{h}_l^{EM-MAP(i+1)} = \hat{h}_l^{pilot} + \beta \cdot \tilde{R}_{hd}\left(\tilde{R}_{dd} + \sigma^2\left(\sum_l^{(i)}\right)^{-1}\right)^{-1}\left(\left(\sum_l^{(i)}\right)^{-1}\left(M_l^{(i)}\right)^H y^{data} - \hat{d}_l^{pilot}\right) \tag{17}$$

This β can be adaptively optimized depending on different cases. In some embodiments, β=0.8 is a good compromised value for various scenarios. The CE module 130 can process the received inputs, and generate the output signal on line 170. For example, the CE module 130 can process $\hat{h}_l^{pilot}$ and can output $\hat{h}_l^{EM\text{-}MAP(i+1)}$ on the output line 170.

Some embodiments disclosed herein include a data-aided EM-MAP, sequential filtering with additional scaling: for the model mismatches in some scenario, consider the modified sequential data-aided EM-MAP equation (17), which is equation (10) with additional scaling factor β in the updating term. To further simplify the matrix inversion operation in equations (10) or (17), the following approximation can be used:

$$\tilde{R}_{hd}\left(\tilde{R}_{dd}+\sigma^2\left(\sum\nolimits_l^{(i)}\right)^{-1}\right)^{-1}\approx \tilde{R}_{hd}\left(\tilde{R}_{dd}+\alpha\sigma^2 I\right)^{-1}\underbrace{\text{diag}\left(\tilde{R}_{dd}+\alpha\sigma^2 I\right)\left[\text{diag}\left(\tilde{R}_{dd}+\sigma^2\left(\sum\nolimits_l^{(i)}\right)^{-1}\right)^{-1}\right]^{-1}}_{scaling\ per\ RE} \tag{18}$$

The coefficient α can be optimized numerically and the optimal value can be found to be at α≈0.5. The CE module 130 can process the received inputs, and generate the output signal on line 170. For example, the CE module 130 can process $\hat{h}_l^{pilot}$+β and can output $\hat{h}_l^{EM\text{-}MAP(i+1)}$ on the output line 170.

Some embodiments disclosed herein include a matrix inversion approximation: to achieve lower complexity, the matrix inversion portion in data-aided EM-MAP with sequential filtering can be approximated by equation (18), where α can be optimized numerically with simulation.

The ItCE technique can be implemented by a look-up table (LUT) 175 (of FIG. 1), by pre-computing and storing all the weight matrices $$\tilde{R}_{hd}\left(\tilde{R}_{dd}+\sigma^2\left(\sum\nolimits_l^{(i)}\right)^{-1}\right)^{-1}$$

set forth in (10), or their simplified versions based on approximation (18). For example, the CE module 130 can pre-compute and store weight matrices $$\tilde{R}_{hd}\left(\tilde{R}_{dd}+\sigma^2\left(\sum\nolimits_l^{(i)}\right)^{-1}\right)^{-1}$$

set forth in (10) in the LUT 175, or their simplified versions based on approximation (18). In this manner, the noise variance $\sigma^2$ or equivalently the SNR can be quantized. For example, the SNR can be quantized in a quantization step of 6 dB, i.e., the SNR can be approximated up to ±3 dB, for example. The CE module 130 can process the received inputs, and generate the output signal on line 170. For example, the CE module 130 can approximate a matrix inversion portion in a data-aided EM-MAP with sequential filtering, and can perform the approximation using equation (18), where a can be optimized numerically with simulation, after which the CE module 130 can provide an output on the output line 170.

Some embodiments disclosed herein include an SNR approximation: to achieve further low complexity, the term associated $\tilde{R}_{dd}+\alpha\sigma^2 I$ in equation (18) can be implemented by the LUT 175, by pre-computing and storing the results with different noise variance $\sigma^2$.

Some embodiments disclosed herein include a derivation for multiple data layers. Assuming that data feedback contains L layers, the equation (1) can become:

$$y=\begin{bmatrix} y^{pilot} \\ y^{data}\end{bmatrix}=\begin{bmatrix} \sum_{k=0}^{1} C_k p_{j_k} \\ \sum_{j=0}^{L-1} X_j d_j \end{bmatrix}+z \tag{19}$$

where $j_k$ is the layer associated to FD-OCC sequence k (e.g., the FD-OCC sequences can be repeated in different CDM groups when L>2). For example, if estimating the channel for the third layer ($h_2$), consider the pilots in the second CDM group, and therefore $y^{pilot}=C_0p_2+C_1p_3$. In this example, $j_0=2$ and $j_1=3$. The sequential MMSE filter can be derived as follows:

$$\hat{h}_l^{MMSE}=\hat{h}_l^{pilot}+\tilde{R}_{h_l d_{all}}\mathbb{E}_{X_{all}|y}\left[\left(X_{all}^H X_{all}\right)\left(\tilde{R}_{d_{all}d_{all}}+\sigma^2 I\right)^{-1}\left(X_{all}^H y^{data}-\left(X_{all}^H X_{all}\right)\hat{d}_{all}^{pilot}\right)\right] \tag{20}$$

Where $$\tilde{R}_{h_l d_{all}}=\left[0\ \cdots\ R_{h_l d_l}\ \cdots\ 0\right]-R_{h_l p_{j_l}}C_{l'}P^{-1}\left[0\ \ldots\ C_{l'}R_{p_{j_l}d_l}\ \cdots\ 0\right] \tag{21}$$

$$\tilde{R}_{d_{all}d_{all}}=\begin{bmatrix} R_{d_1d_1} & \cdots & 0 \\ \vdots & \ddots & \vdots \\ 0 & \cdots & R_{d_Ld_L}\end{bmatrix}-\left[0\ \cdots\ R_{d_l p_{j_l}}C_{l'}\cdots\ 0\right]^T P^{-1}\left[0\ \cdots\ C_{l'}R_{p_{j_l}d_l}\ \cdots\ 0\right] \tag{22}$$

$$P\overset{def}{=}C_0R_{pp}C_0+C_1R_{pp}C_1+\sigma^2 \tag{23}$$

$$X_{all}\overset{def}{=}\left[\,X_0\ \cdots\ X_{L-1}\,\right],\ d_{all}\overset{def}{=}\begin{bmatrix} d_0 \\ \vdots \\ d_{L-1}\end{bmatrix} \tag{24}$$

The equation (20) can be converted to a soft MMSE or EM-MAP, as explained in the single data layer case, applying the expectation to terms $X_{all}^H X_{all}$ and $X_{all}^H$ (for soft MMSE) and furthermore conditioning the expectation on the channel estimate at the previous iteration (for EM-MAP). However, this approach may be impractical because: (i) the size of the matrix inverse scales by the number of layers; and (ii) $\mathbb{E}_{X_{all}|y,\hat{d}_{all}^{(i-1)}}[X_{all}^H X_{all}]$ involves computing cross-correlations for each pair of layers. The CE module 130 can process the received inputs, and generate the output signal on line 170. For example, the CE module 130 can process $\hat{h}_l^{pilot}$ and can output $\hat{h}_l^{MMSE}$ on the output line 170.

Some embodiments disclosed herein include multi-layer data-aided EM-MAP with sequential filtering: the multi-layer sequential form of data aided EM-MAP can be derived as equation (20)-(24) based on the system model (19). Approximated approaches of soft MMSE or EM-MAP as shown above can also be options. Due to the high complexity inherited in multi-layer data-aided EM-MAP, multiple layers can be handled by soft interference cancellation (SIC) and/or sequential SIC (seq-SIC).

Using a SIC technique, data of interfering layers can be removed from the received signal y. For layer l, the output of SIC can be:

$$y_l^{SIC} = \begin{bmatrix} y^{pilot} \\ y^{data} - \sum_{j \neq l} \mathbb{E}_{X_j | y, \hat{d}_j^{pilot}}[X_j] \hat{d}_j^{pilot} \end{bmatrix} \quad (25)$$

In practice, the received signal can be reconstructed and removed on the data feedback REs 160 for all interfering layers j≠l, by using the estimated channel $\hat{d}_j^{pilot}$ from pilot-based CE and the soft symbol estimates $\mathbb{E}_{X_j|y,\hat{d}_j^{pilot}}[X_j]$ calculated through the APPs from the LLRs 135. In other words, the soft symbol estimates can be the same as $M_j^{(0)}$ as defined in equation (9), under the assumption that $X_l$ and $X_j$ (for j≠l) are conditionally independent given y and $\hat{d}_j^{pilot}$. After SIC has been performed on the received multi-layer signal, the signal model can be reduced to the single-layer case. Therefore, the same single-layer sequential ItCE algorithm (i.e., equation (10)) can be applied, with y replaced by $y_l^{SIC}$. Instead of solving with all layers present, each layer can be processed individually as if it is a single layer model.

One aspect for SIC is that the pilot-based CE $\hat{d}_j^{pilot}$ and the soft symbol estimation $\mathbb{E}_{X_j|y,\hat{d}_j^{pilot}}[X_j]$ can be used to remove the interfering from layer j. Both of these variables are not necessarily error-free, and can degrade the performance of SIC. However, the performance of SIC can be dominated by the quality of channel $\hat{d}_j^{pilot}$ used in equation (25) in the targeted channel environment for ItCE.

One approach to improve performance is to perform SIC in sequential order such that $\hat{d}_j^{pilot}$ can be replaced with the updated a $\hat{d}_j^{EM\text{-}MAP}$ from ItCE, layer by layer. In the first layer, a pilot-based CE can be used to perform SIC and perform ItCE to get a $\hat{d}_1^{EM\text{-}MAP}$. In the following layer l, the updated channel from ItCE of previous layers can be used to perform SIC and calculate $\hat{d}_l^{EM\text{-}MAP}$. This can be referred to as sequential SIC.

Pseudo-code for sequential SIC can be described as follows, using the following simplified notation: $\mathbb{E}$ $\hat{X}_j$ denotes the soft estimate $\mathbb{E}_{X_j|y,\hat{d}_j^{pilot}}[X_j]$ in layer j.

$\hat{d}_l^n$=channel estimates on data feedback REs after n ItCE iterations (n=0 means pilot-based estimate), for layer l.

$\hat{h}_l$=channel estimates on data REs (including data feedback REs) for layer l.

$\hat{p}_l$=channel estimates on pilot REs for layer l.

---

Pseudo code for sequential SIC:

Line 1: Define layer processing order, e.g., S = [1 2 3 4].

Line 2: Initialize SIC iteration index for all layers: n = [0 0 0 0].

Line 3: For $i_{SIC}$ = 1:K · L (with K ≥ 1):

Line 4: Do SIC for layer l = S(mod($i_{SIC}$ − 1, L) + 1) using the latest available channel estimate for each interfering layer:
$y_l^{SIC} = y^{data} - \Sigma_{j\neq l} \hat{X}_j \hat{d}_j^{n_j}$.

Line 5: Apply single layer ItCE with $y_l^{SIC}$ as input → output $\hat{d}_l^{n_l+1}$, $\hat{p}_l$ (depending on ItCE techniques, see details in following section, and only when $\left(\left\lceil \frac{i_{SIC}}{L} \right\rceil = K\right)$.

Line 6: [Optional] Do SIC again for all layers using the last CE output:
$y_l^{SIC} = y^{data} - \Sigma_{j\neq l} \hat{X}_j \hat{d}_j^{K}$, and apply ItCE to update $\hat{d}_l^{K+1}$, $\hat{p}_l$.

---

The following parameters can be adjusted in the sequential SIC procedure: the layer ordering S (line 2), the number of iterations K (line 3), and/or the optional final SIC+ItCE step (line 4). The CE module 130 can process the received inputs, and generate the output signal on line 170. For example, the CE module 130 can process code that corresponds to and/or is equivalent to the above pseudo-code to achieve a processing of sequential SIC.

Some embodiments disclosed herein include a sequential SIC with multi-layer iterative CE: to lower the complexity in multi-layer iterative CE, soft SIC approaches can be used to effectively transform multi-layer CE into a single layer CE problem. To implement SIC in practice, the “SIC+single layer iterative CE” can be implemented in sequential order. Pseudo code for sequential SIC with layer ordering is set forth in the section of pseudo code above.

Some embodiments disclosed herein include ItCE techniques using data and output patterns. One or more reduced complexity ItCE techniques can be used. An underlying ItCE technique, which can be common to all techniques, is the sequential form of iterative EM-MAP, i.e. equation (10), with SIC or seq-SIC for handling multiple layers, i.e. equation (25). An ItCE “technique” or “scheme” can be defined by one or more of the following design parameters:

Data feedback REs. The number of data feedback REs ($N_D$) can determine the size of matrix inverse $$\left(\tilde{R}_{dd} + \sigma^2\left(\sum_l^{(i)}\right)^{-1}\right)^{-1}$$

in equation (10), which has size $N_D \times N_D$. Once $N_D$ is fixed, the location of data feedback REs can also matter for the performance. Note that matrix inversion need not be performed on-the-fly.

Output REs (i.e., which REs are updated by ItCE). The number of output REs (hereafter denoted as $N_{out}$) can determine the size of the “weight matrix (WM)”, i.e., $$\tilde{R}_{hd}\left(\tilde{R}_{dd} + \sigma^2\left(\sum_l^{(i)}\right)^{-1}\right)^{-1} \in \mathbb{C}^{N_{out} \times N_D},$$

where h is the vectorized version of h in equation (10) and represents the ItCE output at the desired REs. Preferably, ItCE can update all REs, i.e., $N_{RB}$ (12·14−$N_P$), but this may be too complex in hardware because it requires storing a large WM. For this reason, low-complexity techniques can be used where ItCE only updates a subset of the REs.

Interpolation options. When ItCE updates a subset of REs, the channel estimates for the remaining REs can be obtained by frequency domain (FD) and/or time domain (TD) interpolation. For this purpose, multiple options of TD-MMSE and FD-MMSE interpolators can be used.

In the following, ItCE techniques for $N_{RB}$=1 (single RB processing) can be used. From the insights gained with the single RB case, four ItCE techniques for $N_{RB}$=2 (joint 2 RB processing) can be used. In some embodiments, one or more of these ItCE techniques can be used.

I. Single RB Technique with 36 RE Data Feedback

Initially, the case of $N_D$=36 is considered here. The data feedback RE can be distributed on four symbols: e.g., the two DMRS symbols (e.g., 6+6 data REs FDM'ed with DMRS subcarriers, assuming a single CDM group) and/or 2 additional symbols (e.g., 12+12 data REs).

Figure 3:
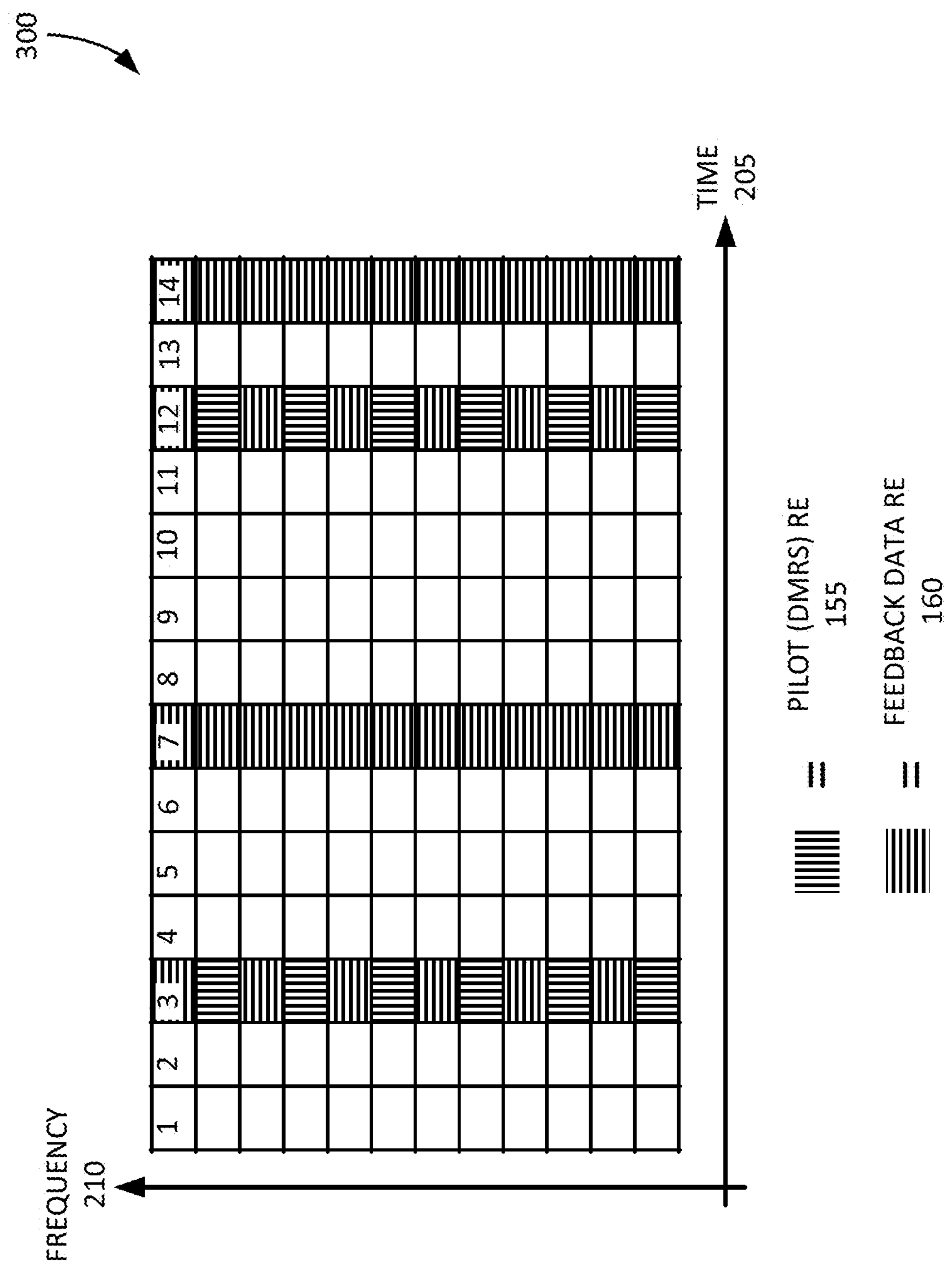
FIG. 3 is an example time-frequency diagram showing an RE data feedback pattern on symbols 3, 7, 12, and 14 in accordance with some embodiments disclosed herein.

FIG. 3 is an example time-frequency diagram 300 showing an RE data feedback pattern on symbols 3, 7, 12, and 14 in accordance with some embodiments disclosed herein. Specifically, the pilot REs 155 and the feedback data REs 160 are on symbols [3 12] and additional feedback data REs 160 are on symbols [7 14]. The choice of [7 14] as data feedback symbols can be motivated by the fact that symbol 14 can be expected to be a bottleneck for CE performance in a slot, while symbol 7 can be approximately at the center of the slot. A slot represents the time duration of 14 OFDM symbols as shown in FIG. 2.

Given this data feedback pattern, two options for ItCE output can be used. In some embodiments, one or more options for ItCE output can be used.

- Output on all REs in the RB: $N_{out}=12\cdot 14-12=156$.
- Output on data and pilot symbols only (e.g., [3 7 12 14])+TD-MMSE interpolation: $N_{out}=48$; the remaining REs can be updated by a 4-tap TD-MMSE interpolator. For simplicity, the TD-MMSE interpolator can adopt the same noise variance $\sigma_{FD\text{-}MMSE}^2$ resulting from FD denoising in the pilot case, although the true noise variance after ItCE can in general be different from $\sigma_{FD\text{-}MMSE}^2$ (likely lower, if ItCE denoising performance is better than that of FD-MMSE).

II. Single RB Technique with 12 RE Data Feedback

Techniques with 36 RE data feedback can involve a 36×36 matrix inversion, which may be too complex. As a simplified option, the data feedback can be reduced to $N_D=12$ REs. In this manner, the matrix inverse size can become 12×12, which can be supported in existing hardware for 12-tap pilot CE.

Figure 4:
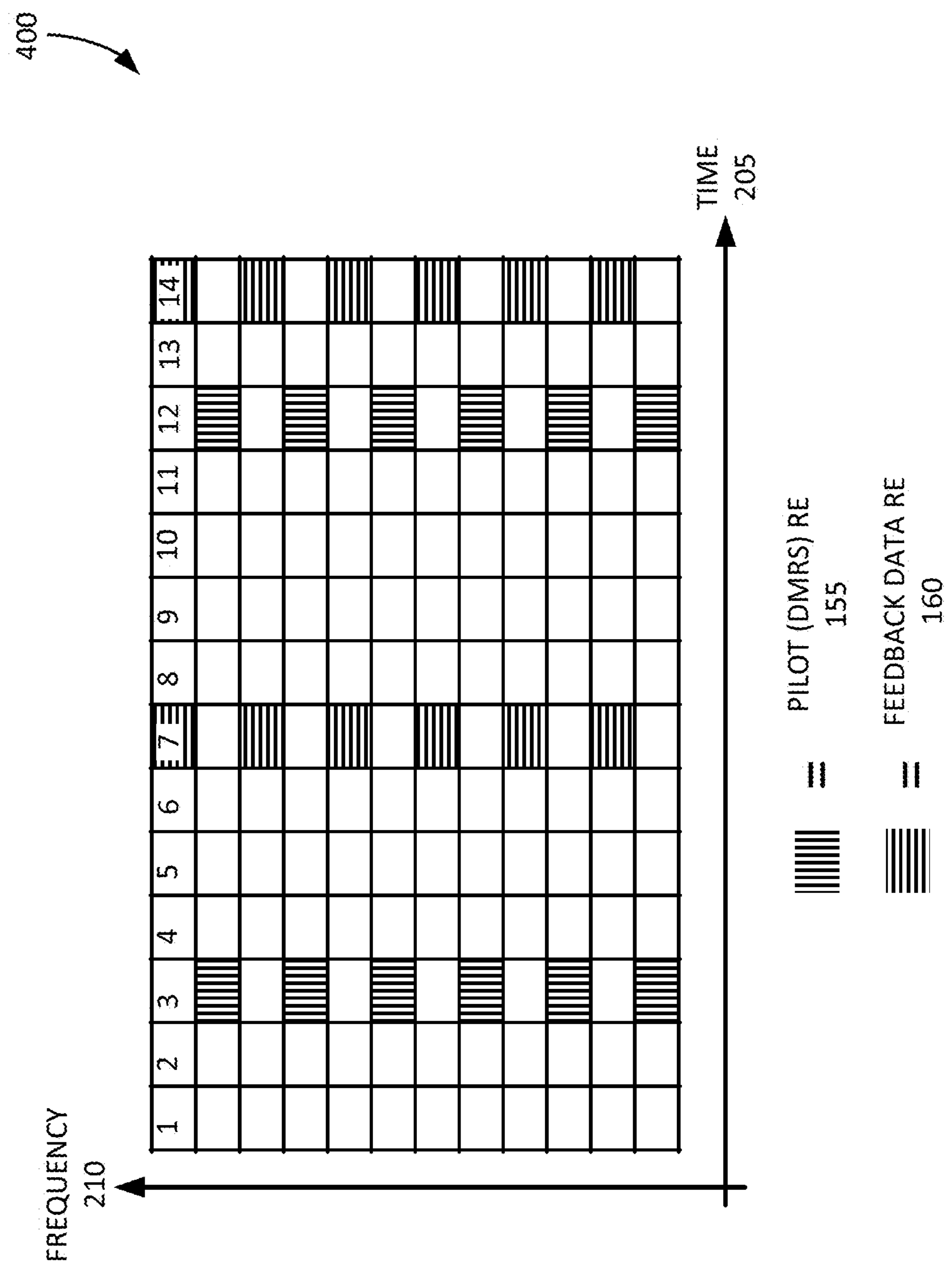
FIG. 4 is an example time-frequency diagram showing a 12 RE data feedback pattern on symbols 7, 14 in accordance with some embodiments disclosed herein.

FIG. 4 is an example time-frequency diagram 400 showing a 12 RE data feedback pattern on symbols 7, 14 in accordance with some embodiments disclosed herein. In this example embodiment, the data feedback REs 160 can be located on symbols [7 14], but in general the data locations can be chosen arbitrarily (e.g., [3 12], [4 11], [2 13], etc.). The case of [3 12] can only be possible if a single CDM group is configured for DMRS.

Given the feedback pattern, a number of options for ItCE output REs and interpolation types can be used. Specifically, regarding ItCE output REs, one or more of the following two techniques can be used:

- Technique 1 (1 RB)=output on data REs+FD-MMSE: $N_{out}=12$ (i.e., the data feedback REs 160 in columns 7 and 14 in FIG. 4); the remaining REs on data symbols (e.g., [7 14]) can be filled by FD-MMSE interpolation. Again, for simplicity, the same FD-MMSE filter of pilot CE can be re-used, with the original noise variance $\sigma^2$, although the resulting noise variance after ItCE on data REs is likely lower than $\sigma^2$.
- Technique 2 (1 RB)=output on all REs for data symbols: $N_{out}=24$ (i.e., all subcarriers for the data symbols, e.g., [7 14]). In this case, no FD interpolation is needed.

TD interpolation can be applied to obtain channel estimates on the remaining symbols. One or more of the following two options can be used for TD interpolation:

- 2-tap TD-MMSE: the two data symbol locations (e.g., [7 14]) can be taken as pilots, so that TD-MMSE is expressed as in (35) with $p^{TD}\in\mathbb{C}^{2\times 1}$.
- 4-tap TD-MMSE: the ItCE output on data symbols (e.g., [7 14]) can be combined with the pilot CE output on DMRS symbols (e.g., [3 12]), resulting in four pilot symbols for TD-MMSE: $p^{TD}\in\mathbb{C}^{4\times 1}$.

In both cases, $\sigma_{FD\text{-}MMSE}^2$ can be used as the noise variance for all symbols. For further optimization, ItCE output symbols can have a different noise variance, which is likely lower than $\sigma_{FD\text{-}MMSE}^2$. It will be understood that, when the data symbols are located on the same DMRS symbols (e.g., [3 12]), only 2-tap TD-MMSE interpolation may be possible.

Some embodiments disclosed herein include one or more ItCE techniques for single RB process with two DMRS symbols: two reduced-complexity ItCE techniques for single RB processing with 2 DMRS symbols, illustrated in FIGS. 3 and 4.

- Data symbol locations and RE patterns, including the number of REs, can be flexible and further optimized.
- It can be conceptually extended to M (M>2) DMRS symbols.

In some embodiments, RB bundling with $N_{RB}=2$ can be used. The following four low-complexity techniques can be used within this framework. It will be understood that $N_{RB}=2$ is an example, and the four low-complexity techniques can be extended to different RB bundling sizes.

Figure 5:
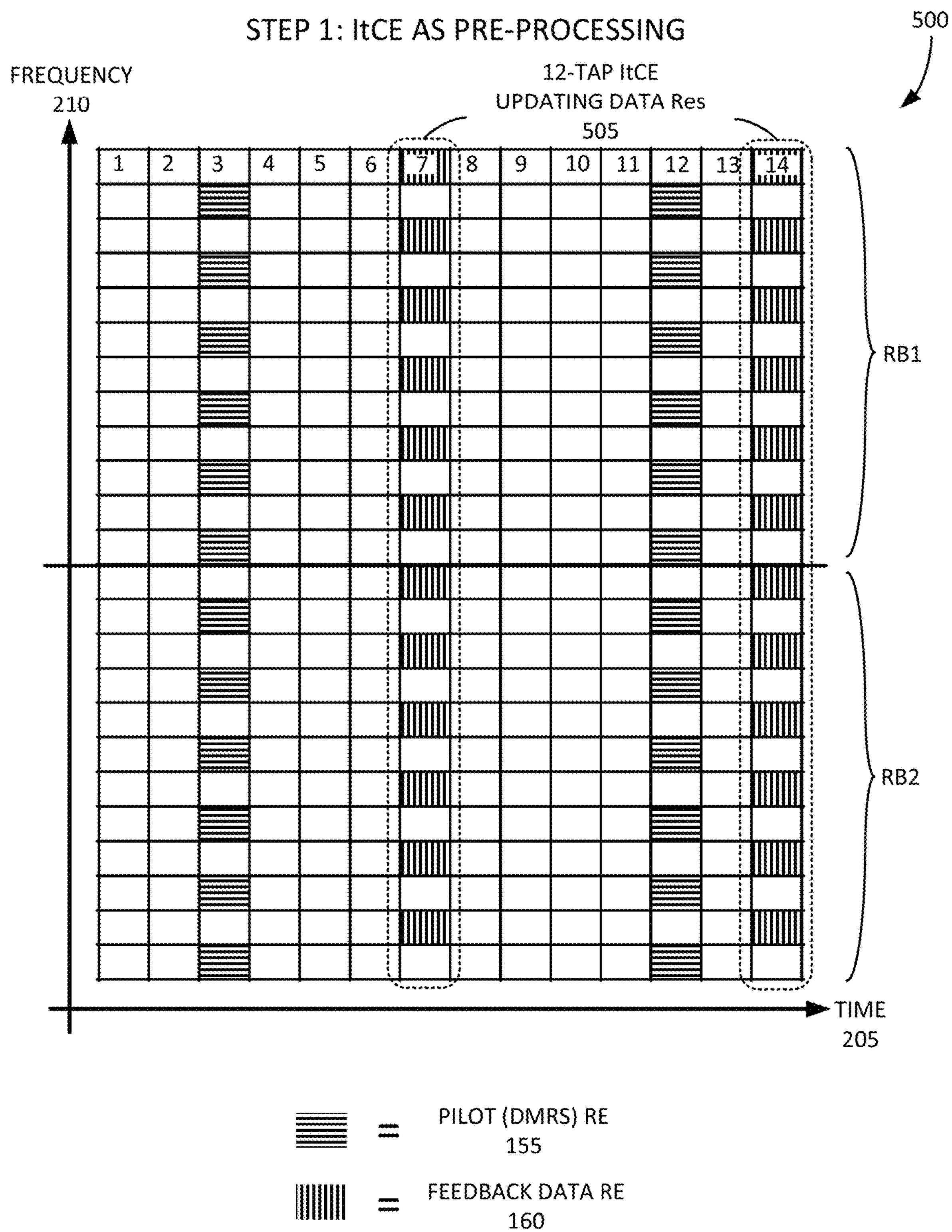
FIGS. 5-7 are example time-frequency diagrams showing processing steps in accordance with some embodiments disclosed herein.
Figure 6:
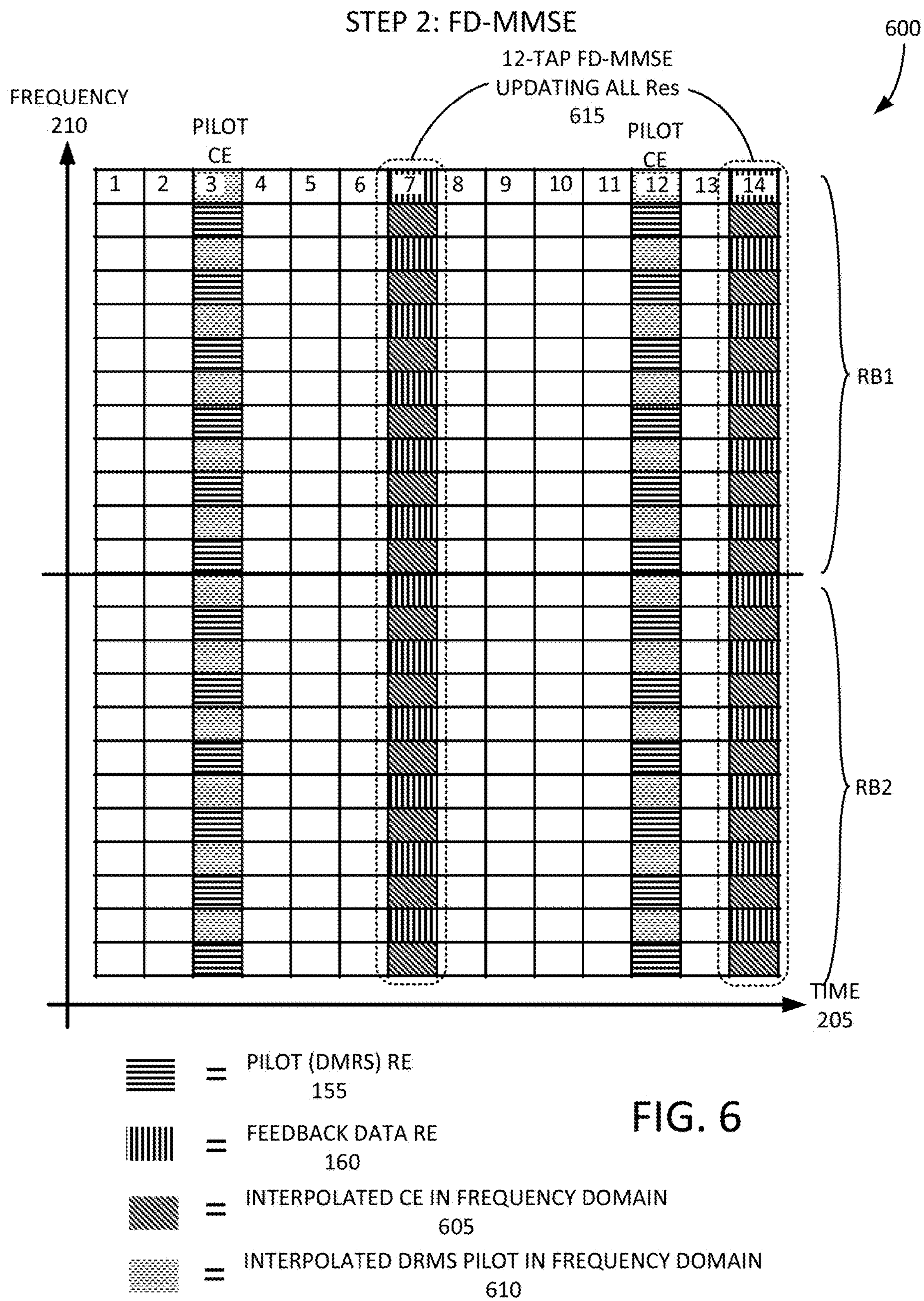
Figure 7:
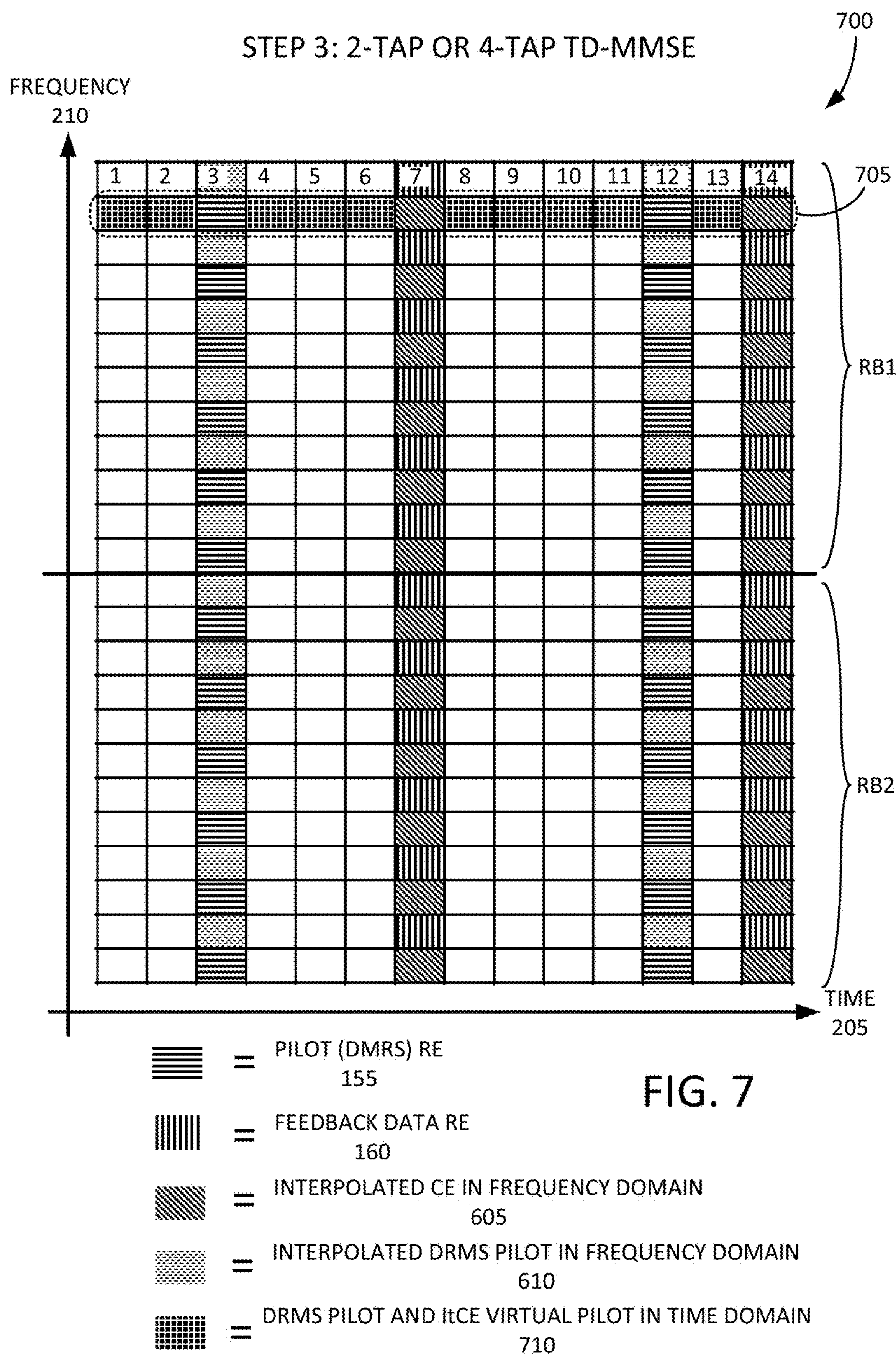

Technique 1 (2 RB): ItCE on data REs+FD and TD interpolation. Technique 1 is illustrated in FIGS. 5-7. FIGS. 5-7 are example time-frequency diagrams 500, 600, 700 showing processing steps in accordance with technique 1 in accordance with some embodiments disclosed herein. Some of the elements and corresponding reference numerals shown in FIGS. 5-7 are described in detail above, and therefore, a detailed description of such elements is not necessarily repeated. The data feedback REs 160 in FIG. 5 can be located on symbols [7 14]. This is for illustration purposes and other choices for symbol locations are not precluded. Since two RBs (i.e., RB1 and RB2 as shown in FIG. 5) can be processed jointly, the total number of data REs can be 24. In order to avoid a 24-tap filter, which may be too complex, the following technique can be used: ItCE can be applied separately to each data symbol (e.g., first symbol 7 and then symbol 14), as shown at 505 in FIG. 5. By doing this, each ItCE process can use $N_D=12$ data feedback REs 160 just like in the single RB case. As explained above, $N_D$ is the number of data feedback REs, and therefore, can indicate a level of complexity. The number of ItCE output REs for each symbol can be $N_{out}=12$ (i.e., the same REs as the data feedback REs 160).

Then, a 12-tap FD-MMSE interpolation can be applied to estimate the channel on all subcarriers for the data symbols, as shown at 615 in FIG. 6. Thereafter, TD-MMSE interpolation can be applied, with either two taps (data symbols only) or four taps (data symbols combined with pilot CE symbols), as illustrated at 705 in FIG. 7. In FIGS. 6 and 7, the sections 605 including diagonal lines represent interpolated CE in the frequency domain. The sections 610 including small dots represent interpolated DRMS pilot in the frequency domain. And the sections 710 including larger dots represent pilot and ItCE virtual pilot in the time domain.

Figure 8:
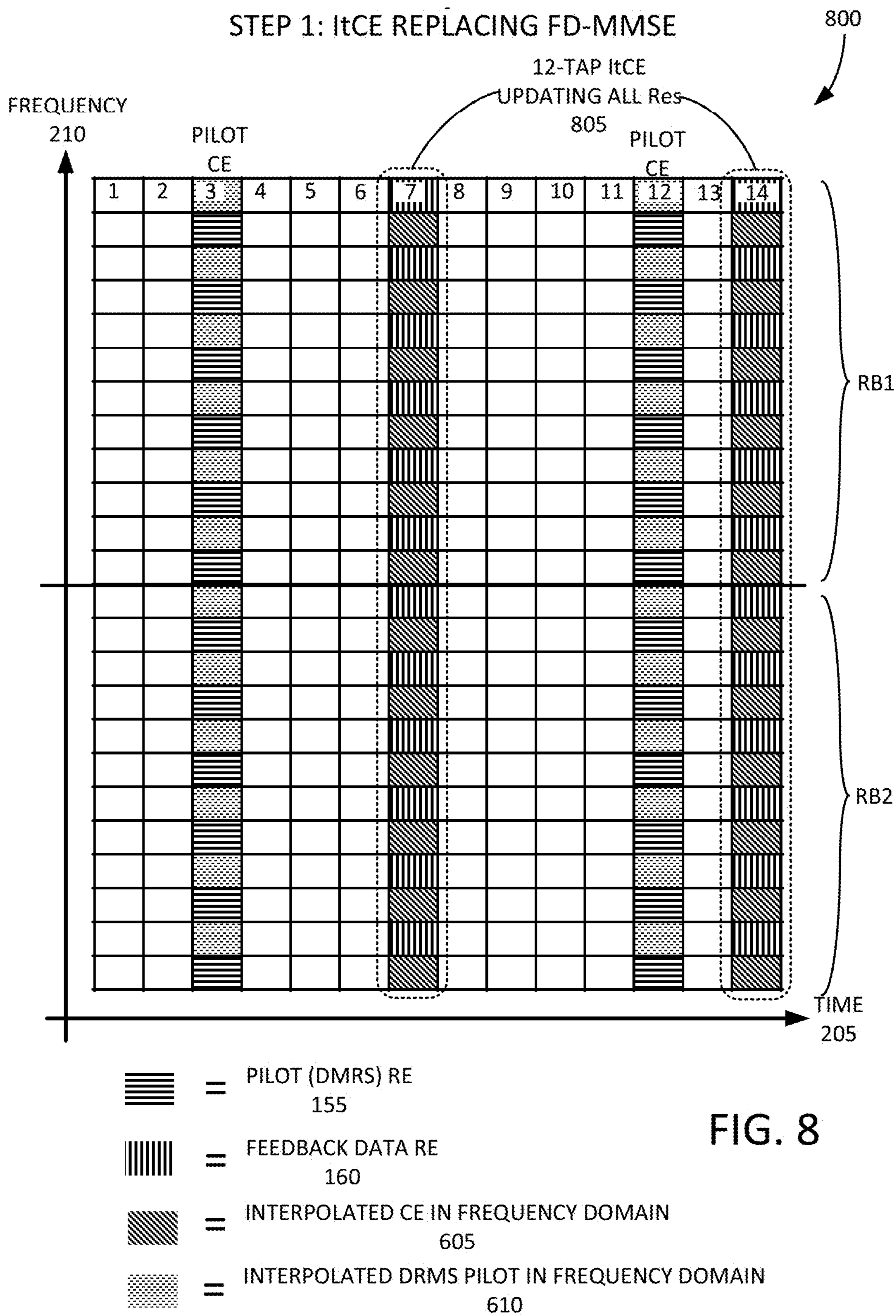
FIGS. 8-9 are example time-frequency diagrams showing processing steps in accordance with some embodiments disclosed herein.
Figure 9:
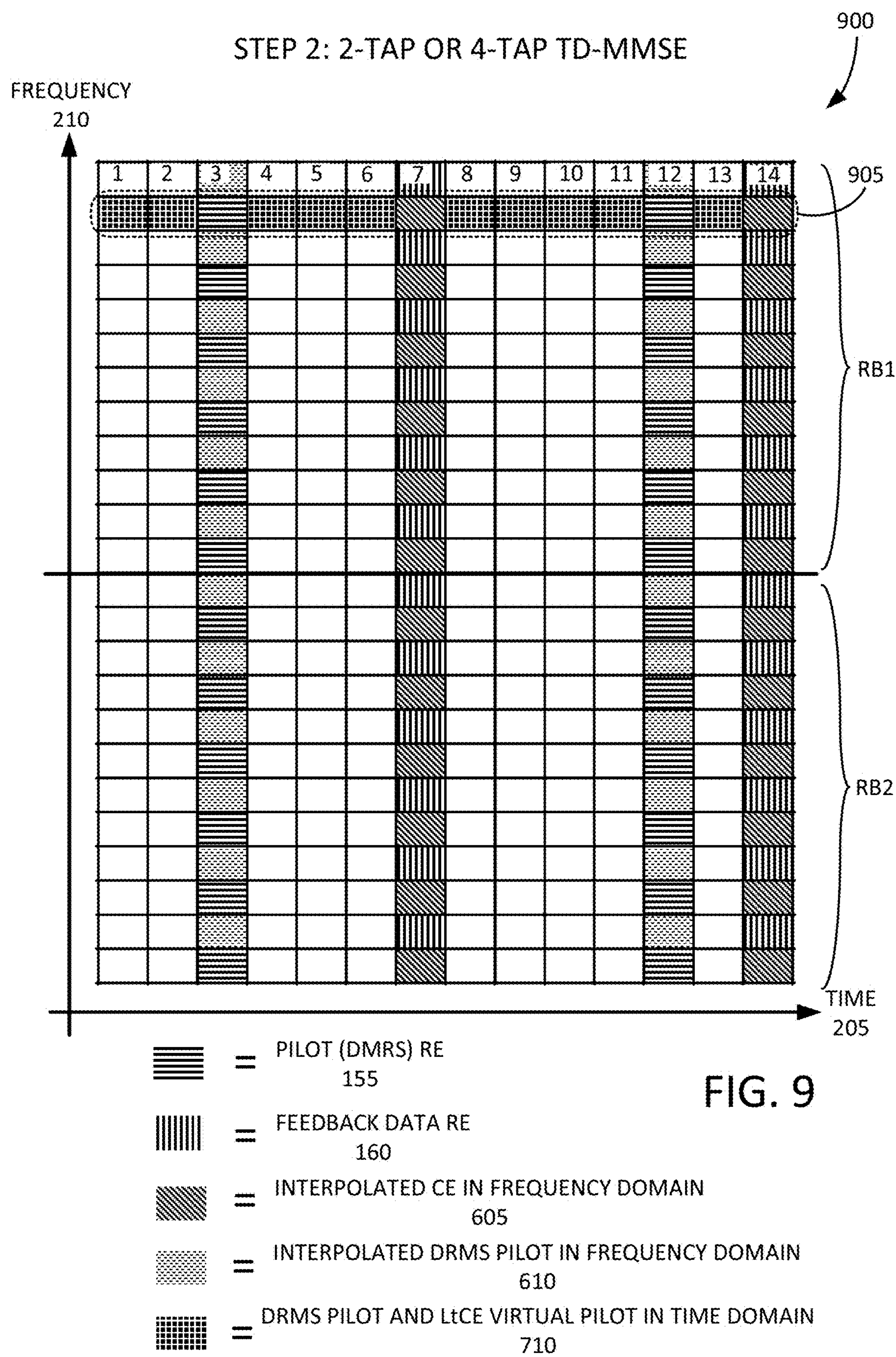

Technique 2 (2 RB): ItCE on data symbols+TD interpolation. FIGS. 8-9 are example time-frequency diagrams 800, 900 showing processing steps in accordance with technique 2 in accordance with some embodiments disclosed herein. Some of the elements and corresponding reference numerals shown in FIGS. 8-9 are described in detail above, and therefore, a detailed description of such elements is not necessarily repeated. For technique 2, $N_D=12$ (per symbol) as in technique 1, but ItCE output can be applied on all REs for data symbols at 805 in FIG. 8, i.e., $N_{out}=24$. As such, the technique 2 need not involve FD-MMSE interpolation, but only TD-MMSE interpolation as shown at 905 of FIG. 9.

Figure 10:
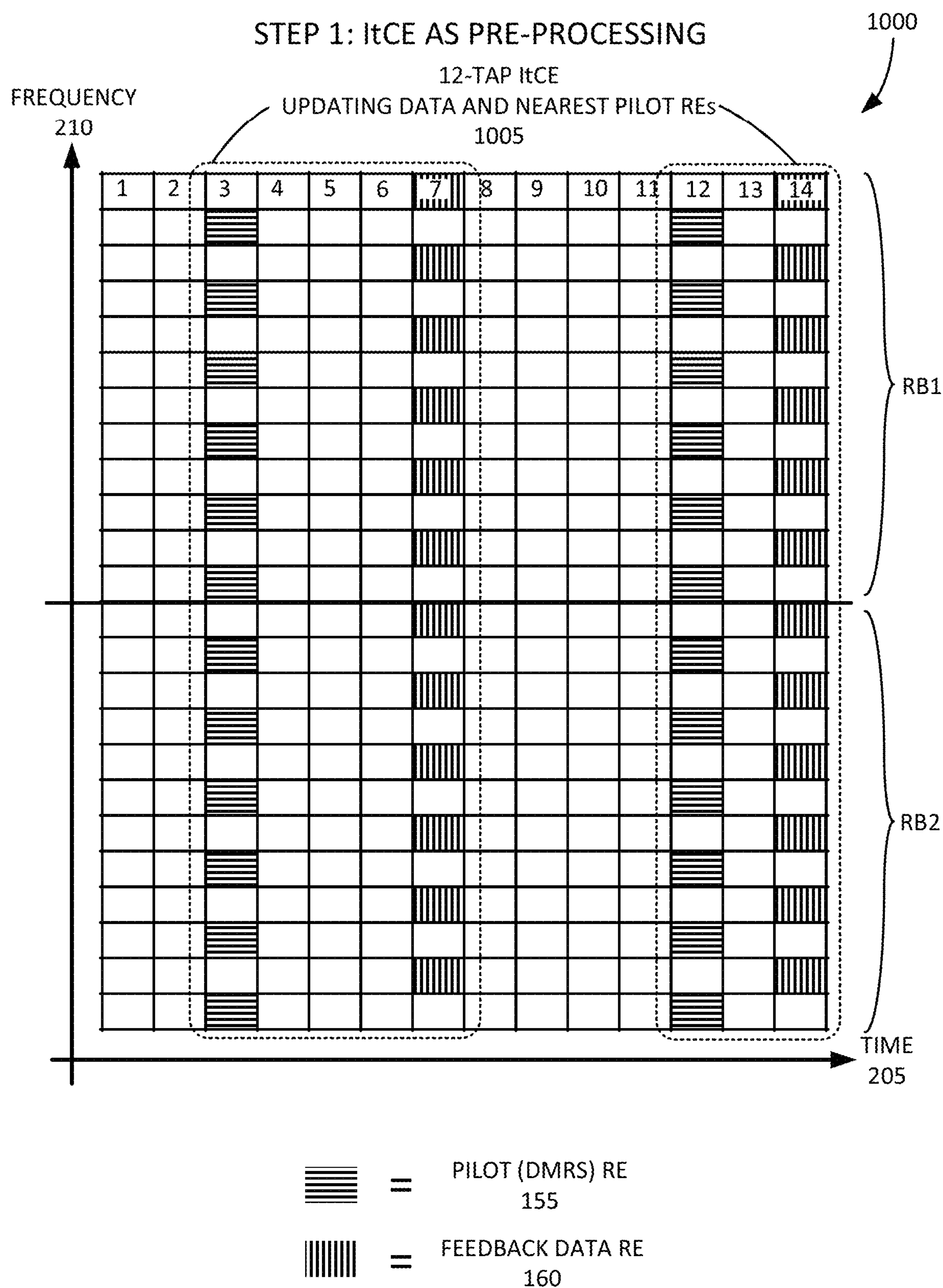
FIGS. 10-12 are example time-frequency diagrams showing processing steps in accordance with some embodiments disclosed herein.
Figure 11:
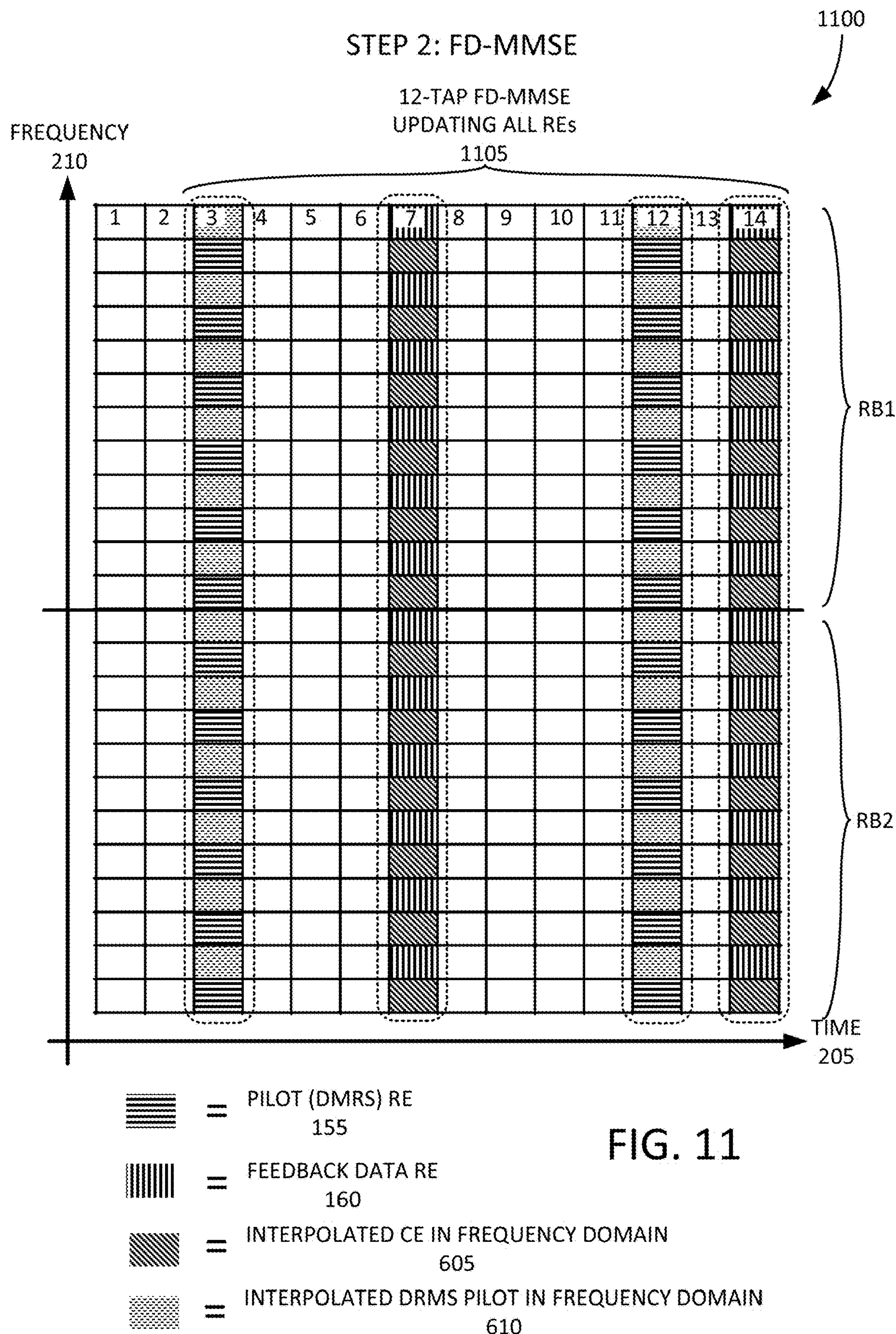
Figure 12:
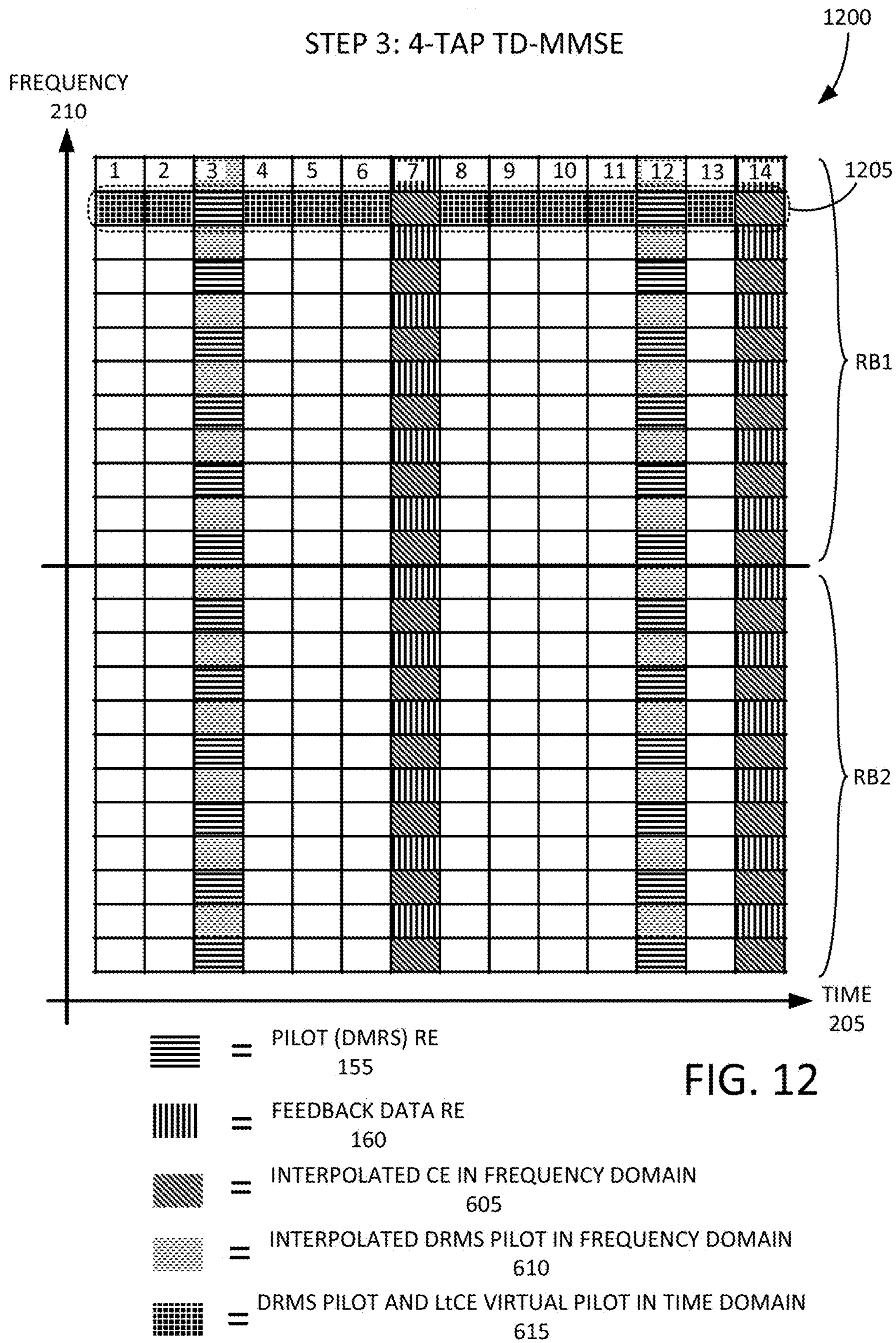

Technique 3 (2 RB): ItCE on data and pilot REs+FD and TD interpolation. FIGS. 10-12 are example time-frequency diagrams 1000, 1100, 1200 showing processing steps in accordance with technique 3 in accordance with some embodiments disclosed herein. Some of the elements and corresponding reference numerals shown in FIGS. 10-12 are described in detail above, and therefore, a detailed description of such elements is not necessarily repeated. In technique 3, the same data feedback REs ($N_D=12$ per symbol)

can be used, and the two data symbols can be processed separately, like in the two previous techniques. However, here, ItCE output is not only on data REs, but also on pilot REs for the nearest DMRS symbol.

As illustrated in FIG. 10, ItCE on data symbol 7 can update the feedback data REs 160 on symbol 7 and the pilot REs 155 on symbol 3, while ItCE on data symbol 14 updates the feedback data REs 160 on symbol 14 and the pilot REs 155 on symbol 12, as shown at 1005. Therefore, $N_{out}$=24 per symbol.

After ItCE, FD-MMSE interpolation can be applied on each of the four updated symbols as shown at 1105 of FIGS. 11, and 4-tap TD-MMSE interpolation can be applied to estimate the channel on the remaining symbols as shown at 1205 of FIG. 12.

Figure 13:
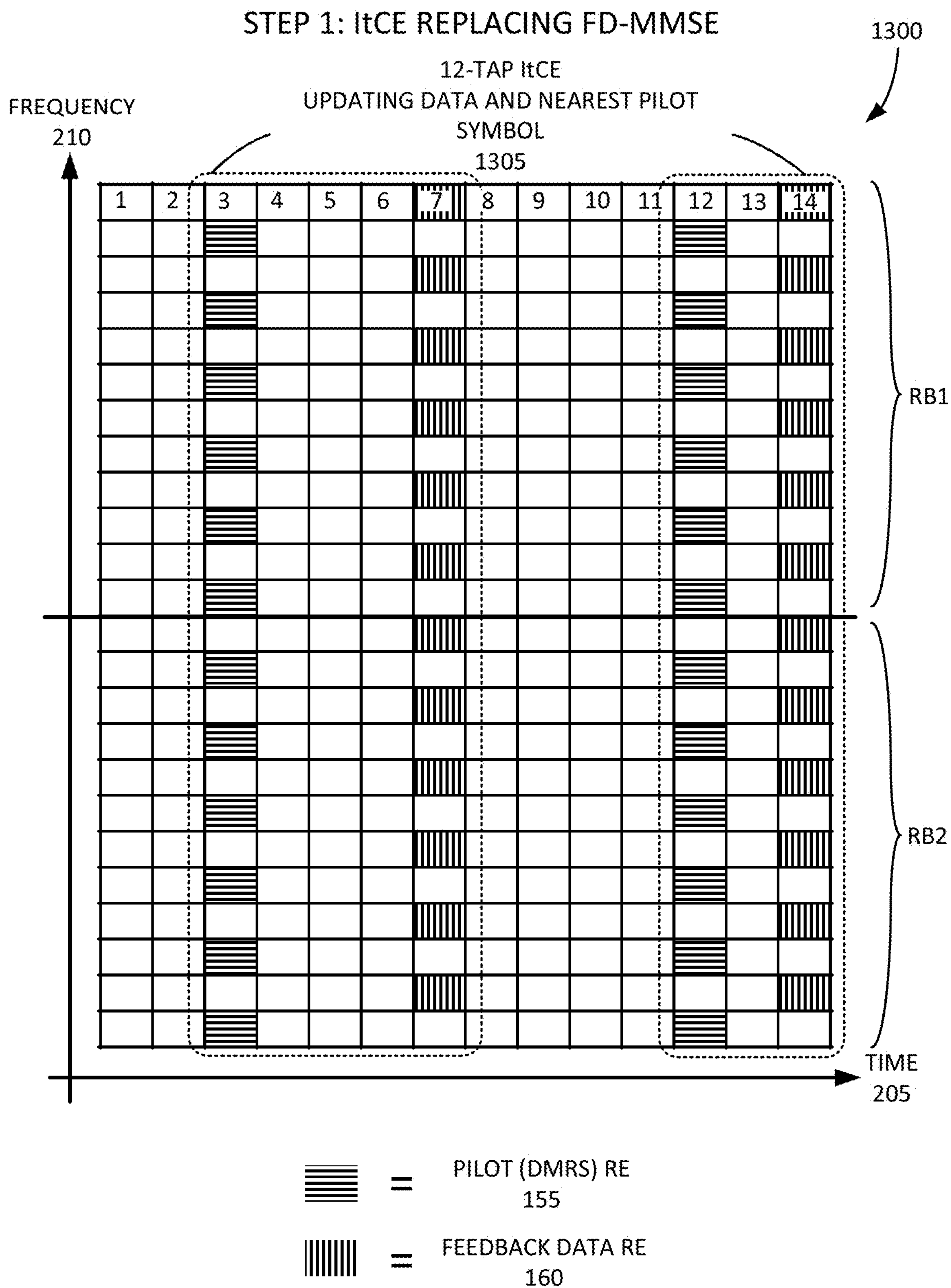
FIGS. 13-14 are example time-frequency diagrams showing processing steps in accordance with some embodiments disclosed herein.
Figure 14:
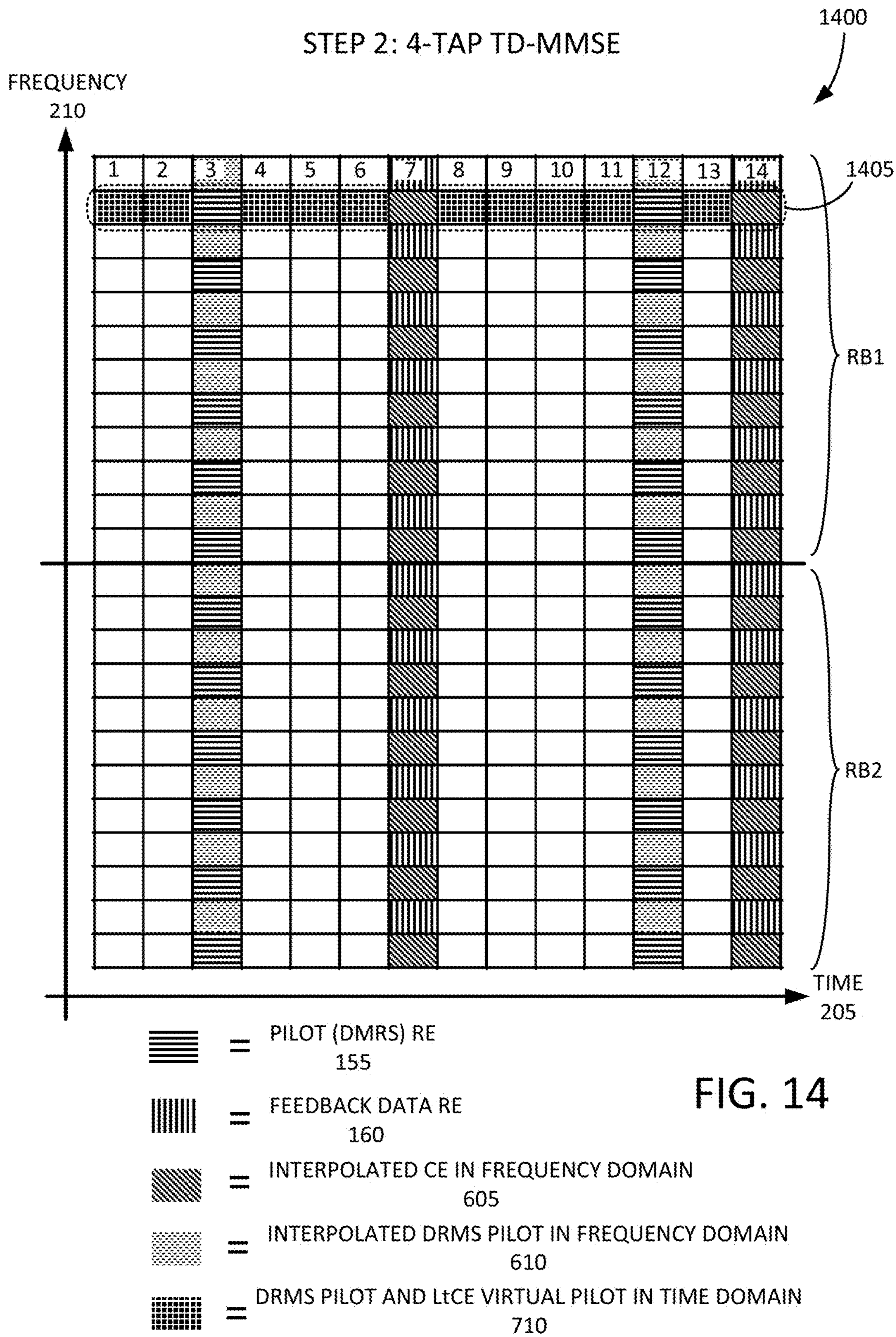

Technique 4 (2 RB): ItCE on data and pilot symbols+TD interpolation. FIGS. 13-14 are example time-frequency diagrams 1300, 1070 showing processing steps in accordance with technique 4 in accordance with some embodiments disclosed herein. Some of the elements and corresponding reference numerals shown in FIGS. 13-14 are described in detail above, and therefore, a detailed description of such elements is not necessarily repeated. Technique 4 is similar to technique 3, except that ItCE output can be applied on all REs for data symbols as shown at 1305 of FIG. 13. As such, technique 4 need not involve FD-MMSE interpolation, but only TD-MMSE interpolation, as shown at 1075 of FIG. 14. For technique 4, $N_D$=12 (per symbol) as in technique 3, but $N_{out}$=48 (per symbol).

In some embodiments, ItCE techniques for 2RB or more joint processing with two DMRS symbols can be used: four reduced-complexity ItCE techniques for 2RB joint processing with 2 DMRS symbols can be explained in the previous four sections and illustrated in FIGS. 5-14.

- Data symbol location and RE patterns can be flexible and further optimized.
- The techniques can be conceptually extended to M (M>2) DMRS symbols.
- For an RB bundle size of 4, a sliding window (e.g., windows size=2RB) with 2RB processing approach can be taken.

Modified technique 1 to technique 4 with higher feedback density: for potentially better performance, higher feedback density can be used in either FD or TD. In FD, the feedback of density can be increased from 0.5 to 1, which means all subcarriers in a given symbol can be used as feedback. In TD, the number of feedback symbols can be increased to a large number, e.g., from 2 to 4. Higher feedback density in FD is now considered. The density can be defined as:

$$\text{density} = \frac{\#\text{ of data feedback } RE \text{ per } RB \text{ in a symbol}}{12}. \tag{26}$$

Therefore, density of 1 indicates that all RE in a given symbol is used for feedback. In this sense, the original techniques 1 to technique 4 described above can have a density of 0.5. Higher density in TD, i.e., more symbols can be utilized for feedback. In this example embodiment, it can be assumed that 4 symbols are used for feedback (e.g., symbols 2, 4, 11, 13 can be used). Two variations can be considered. One is the joint extension of the original techniques described above, and the other is the simple extension as described below. Assume that two pilot symbols and four data symbols are $d_1$, $p_1$, $d_2$, $d_3$, $P_2$, $d_4$ (e.g., arranged in the ascending order in time). Then the joint extension can be written as Technique 1 and/or technique 2 joint extension:
- Using symb $d_1$, $d_2$ update $d_1$, $d_2$. frequency domain interpolation (FDI) or No FDI.
- Using symb $d_3$, $d_4$ update $d_3$, $d_4$. FDI or No FDI.
- 4-tap time domain interpolation (TDI) with $d_1$, $d_2$, $d_3$, $d_4$ Technique 3 and/or technique 4 joint extension:
- Using symb $d_1$, $d_2$ update $d_1$, $p_1$, $d_2$. FDI or No FDI.
- Using symb $d_3$, $d_4$ update $d_3$, $P_2$, $d_4$. FDI or No FDI.
- 6-tap TDI with $d_1$, $p_1$, $d_2$, $d_3$, $P_2$, $d_4$ where FDI and TDI indicates frequency-domain interpolation and time-domain interpolation, respectively. Also, the simple extension can be written as:

Technique 1 and/or technique 2 simple extension:
- Using symb $d_1$, update $d_1$. FDI or No FDI.
- Using symb $d_2$, update $d_2$. FDI or No FDI.
- Using symb $d_3$, update $d_3$. FDI or No FDI.
- Using symb $d_4$, update $d_4$. FDI or No FDI.
- 4-tap TDI with $d_1$, $d_2$, $d_3$, $d_4$ Technique 3 and/or technique 4 simple extension:
- Using symb $d_1$, update $d_1$, $p_1$, $d_2$. FDI or No FDI
- Using symb $d_2$, update $d_1$, $p_1$, $d_2$. Take average with the results of the previous step.
- Using symb $d_3$, update $d_3$, $P_2$, $d_4$. FDI or No FDI.
- Using symb $d_4$, update $d_3$, $P_2$, $d_4$. Take average with the results of the previous step. Apply 6-tap TDI with $d_1$, $p_1$, $d_2$, $d_3$, $P_2$, $d_4$.

In some embodiments, the modified ItCE techniques for 2RB joint processing with two DMRS symbols can be used. Based on the four reduced complexity ItCE techniques for 2RB, higher feedback density can be considered for better performance.

- Higher density in FD: increase FD density from 0.5 to X, where 0.5<X≤1.
- Higher density in TD: use more than two feedback data symbols. For the case of four data feedback symbols, two variations "joint extension" or "simple extension" described in this subsection can be used.

Figure 15:
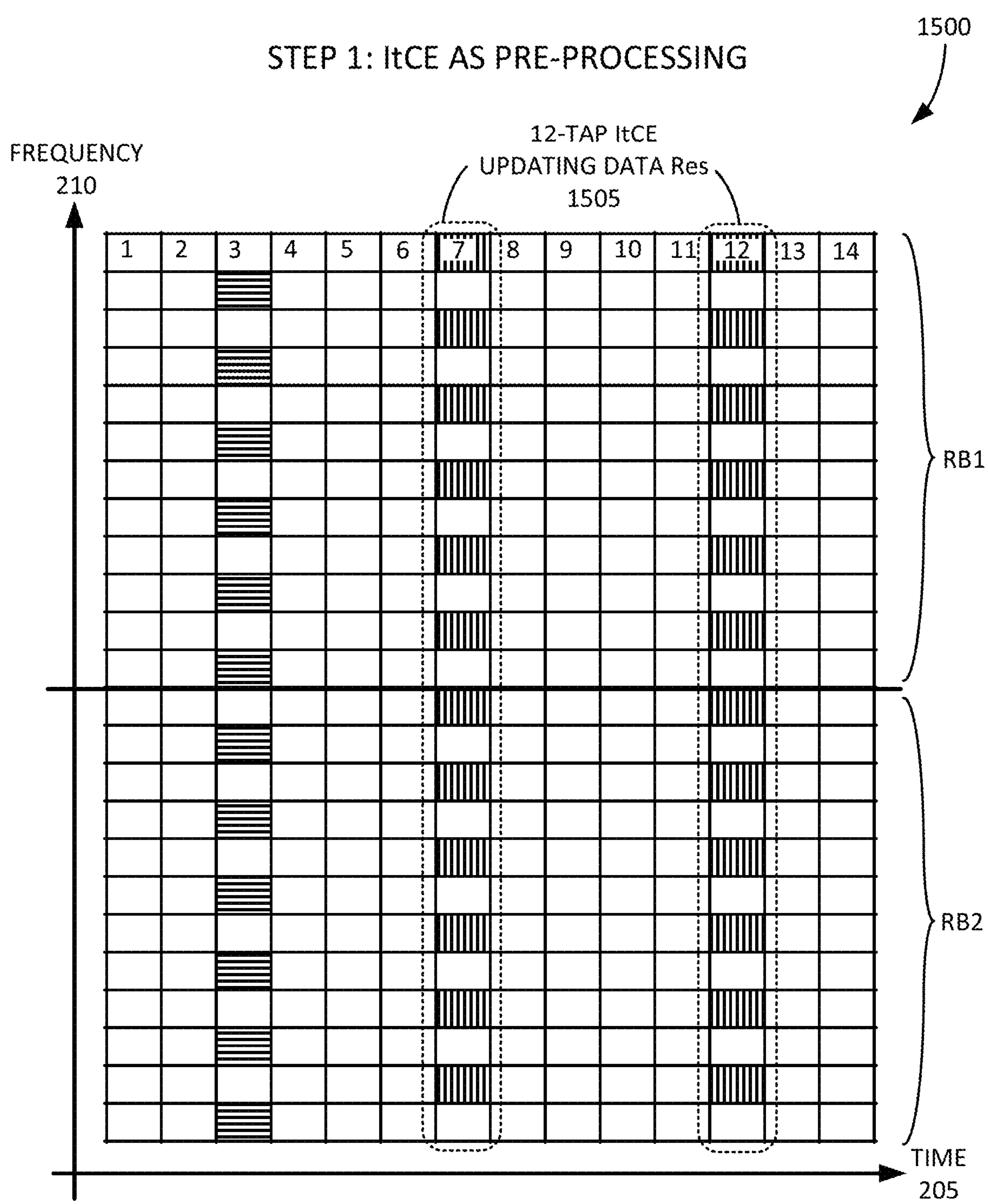
FIGS. 15-17 are example time-frequency diagrams showing another RB bundling technique in accordance with some embodiments disclosed herein.
Figure 16:
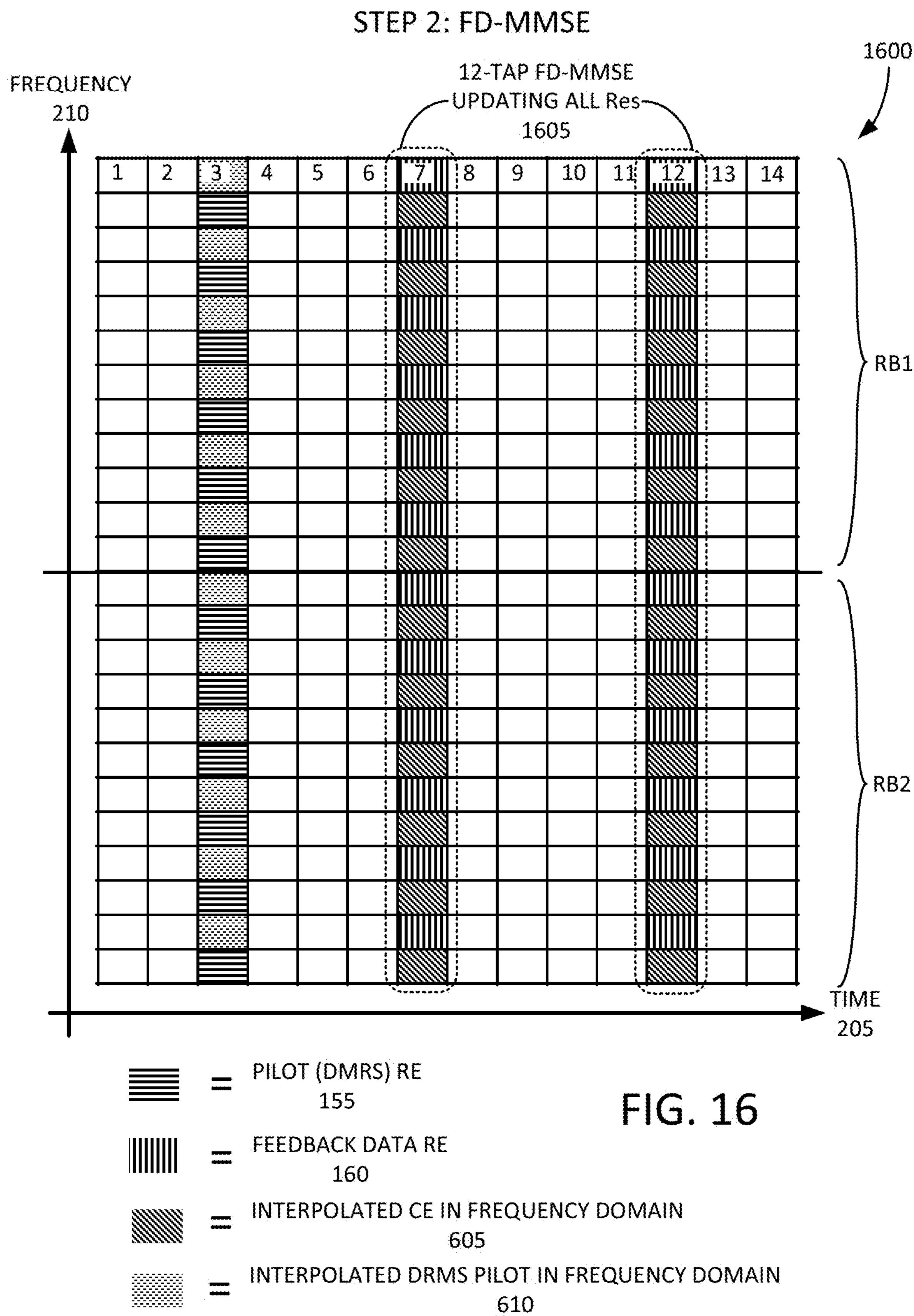
Figure 17:
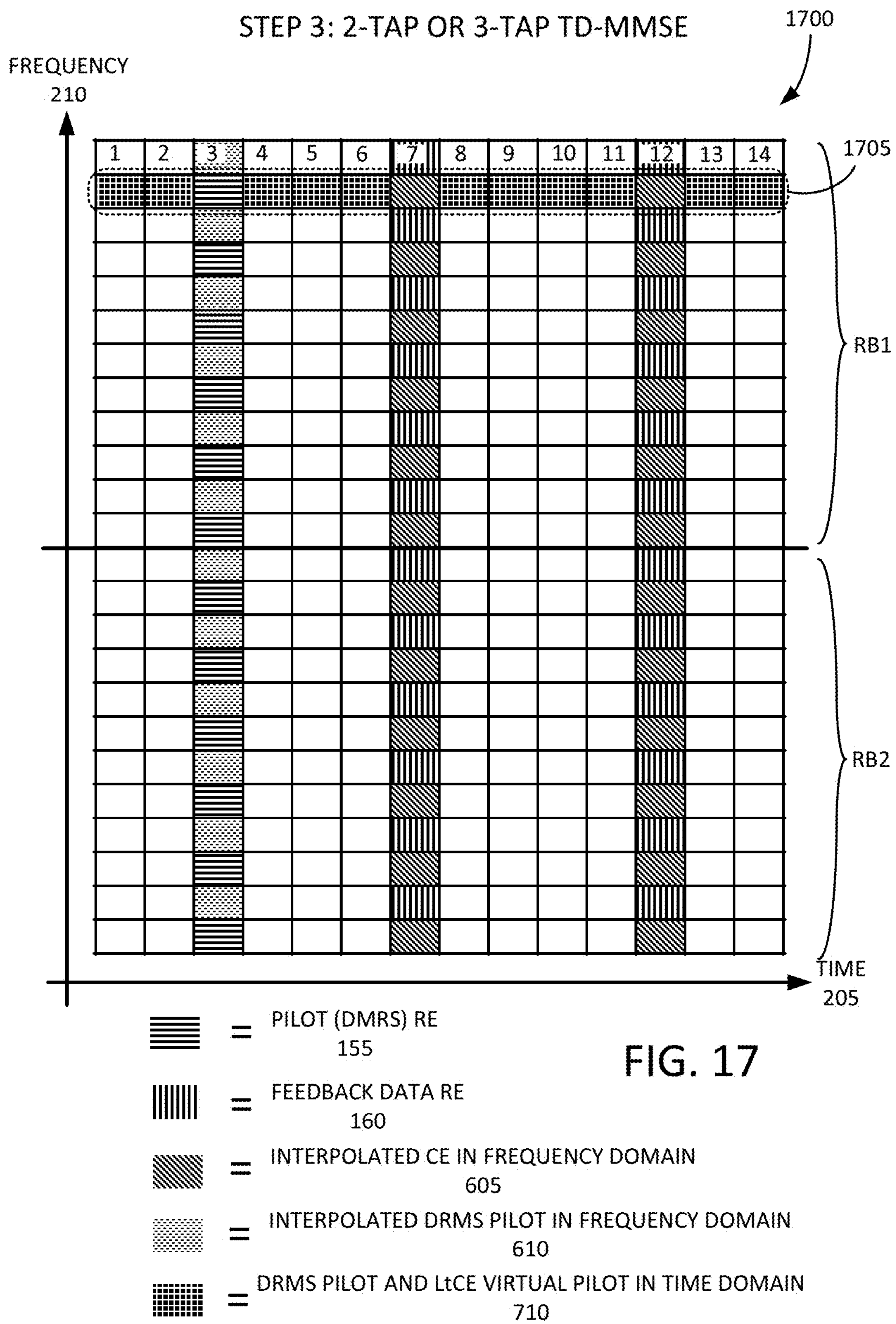

Technique 1 through technique 4 with single DMRS symbol (for FR2): in the original techniques 1 to 4 described above, two DMRS symbols configuration can be assumed. In some environments, especially in FR-2, a configuration can include a single front-ended DMRS symbol in a slot. FIGS. 15-17 are example time-frequency diagrams 1500, 1600, 1700 showing another RB bundling technique in accordance with some embodiments disclosed herein. Some of the elements and corresponding reference numerals shown in FIGS. 15-17 are described in detail above, and therefore, a detailed description of such elements is not necessarily repeated.

For technique 1 and technique 2, since the output RE can be on the same symbols as data feedback symbols, the steps are quite similar to two DMRS symbols cases. As illustrated in FIG. 15, ItCE can update the feedback data REs 160, as shown at 1505. After ItCE, FD-MMSE interpolation can be applied as shown at 1605 of FIG. 16. A primary difference is in the last step, TD-MMSE interpolation, with either 2 taps (e.g., data symbols only) or 3 taps (e.g., data symbols combined with pilot CE symbols, as shown at 1705 of FIG. 17.

Figure 18:
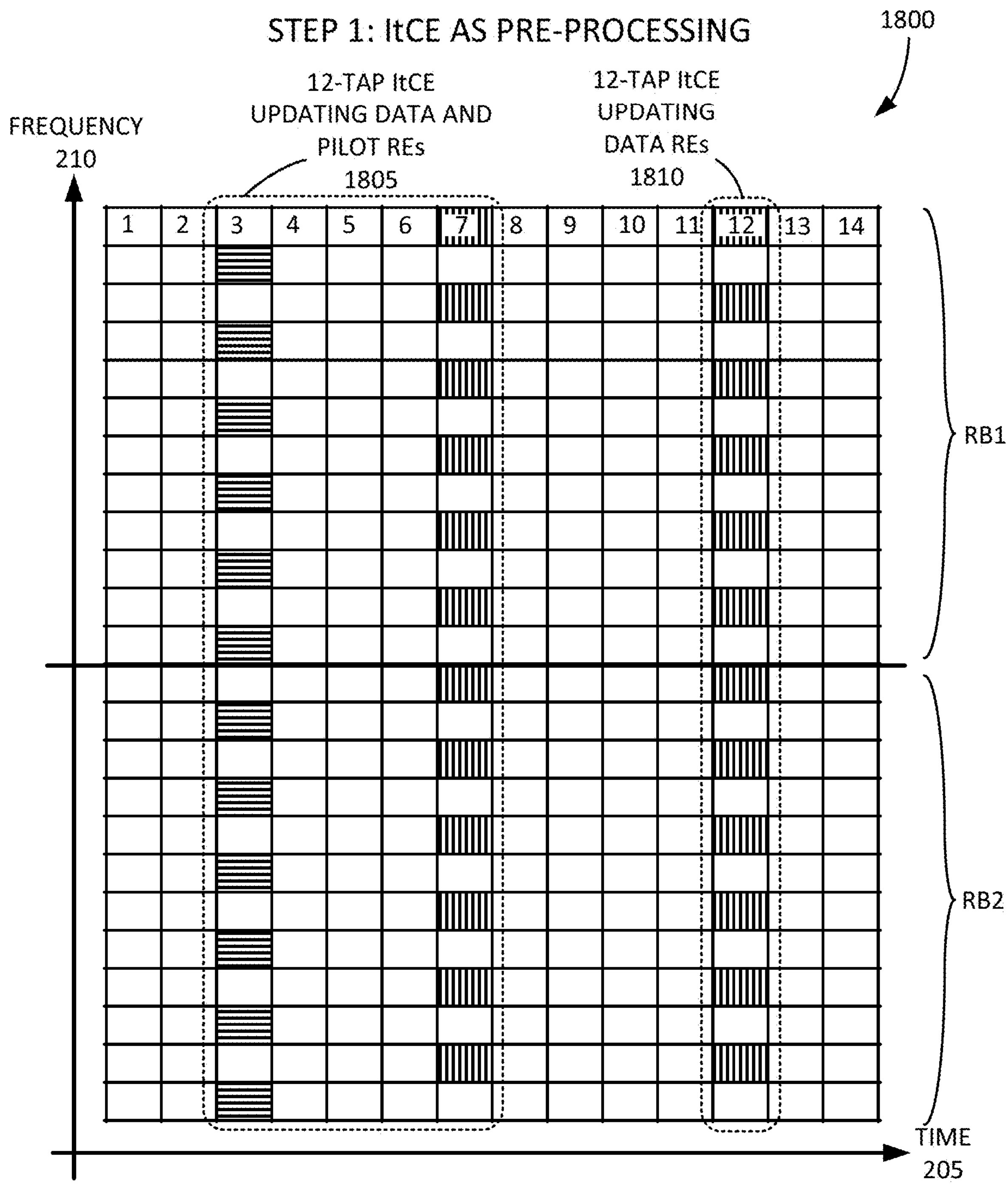
FIGS. 18-20 are example time-frequency diagrams showing another RB bundling technique in accordance with some embodiments disclosed herein.
Figure 19:
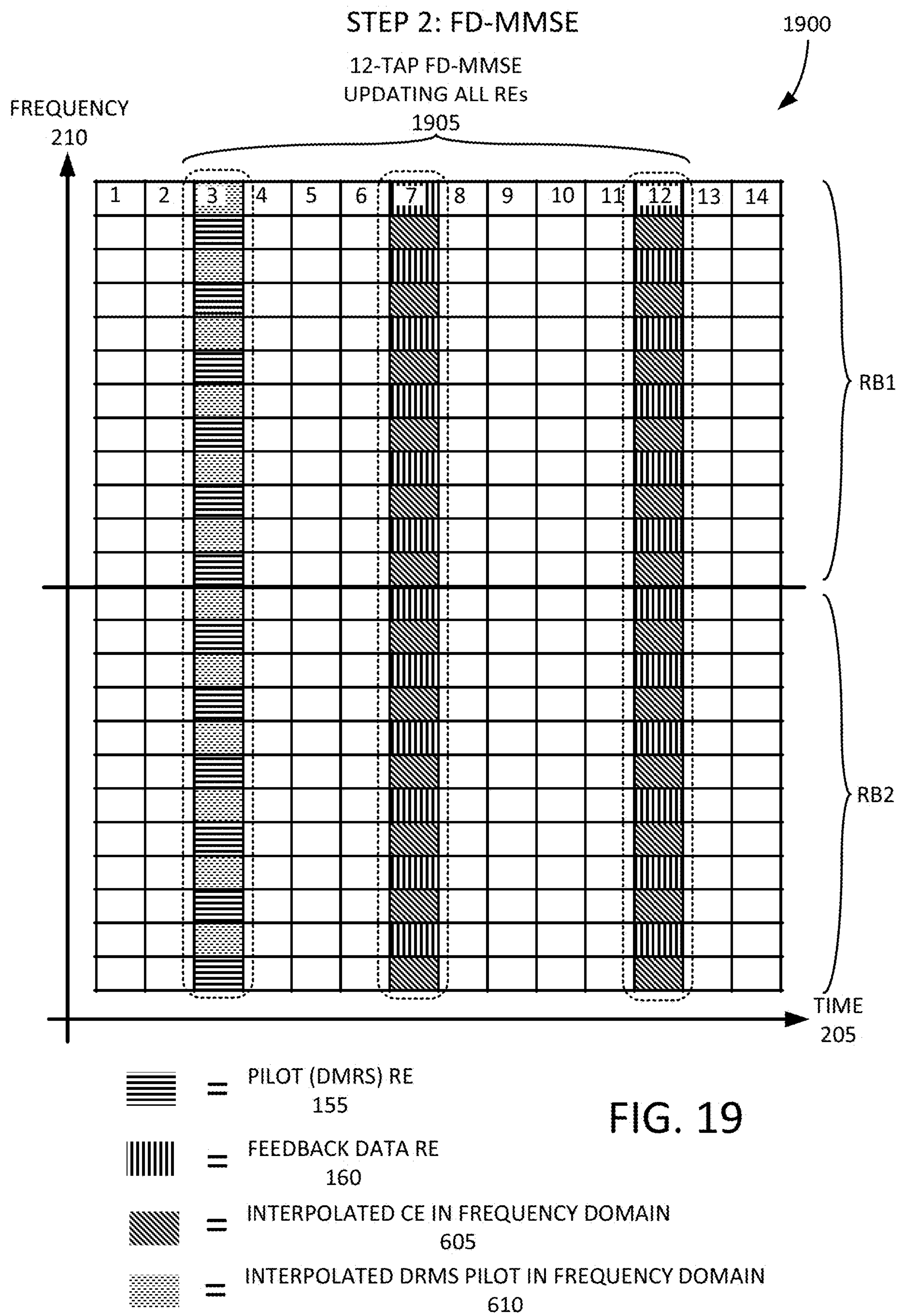
Figure 20:
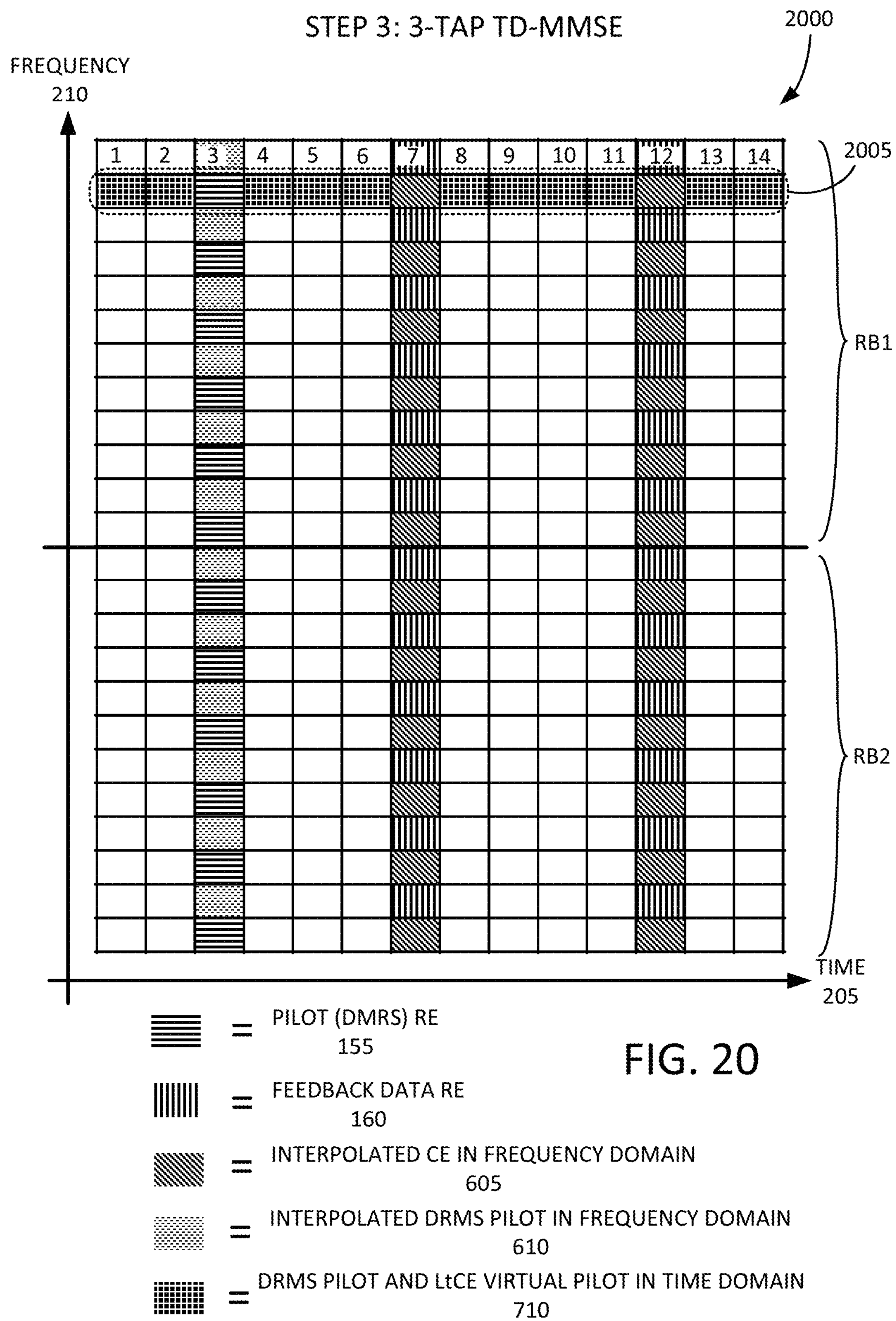
Figure 21:
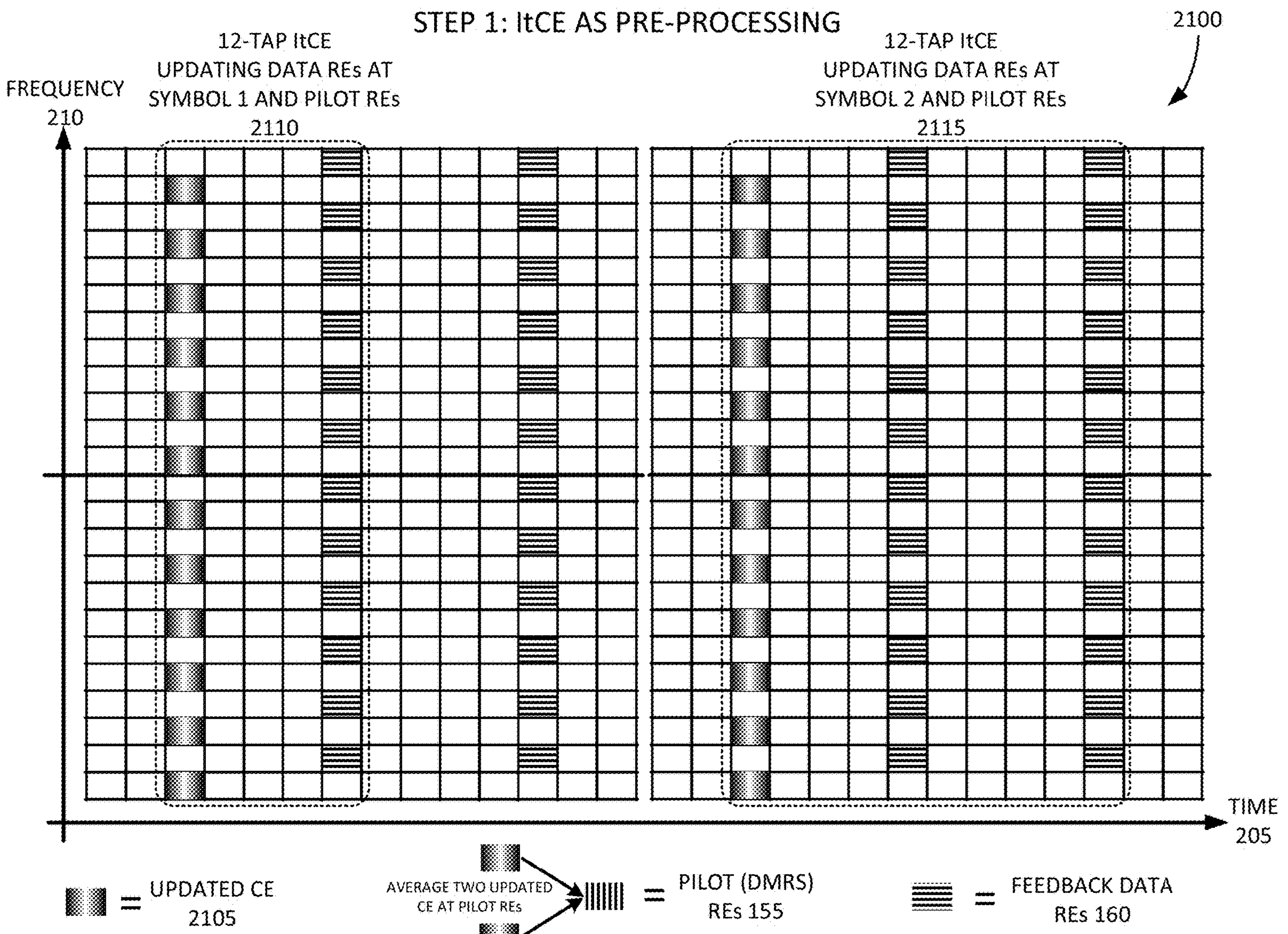
FIGS. 21-23 are example time-frequency diagrams showing yet another RB bundling technique in accordance with some embodiments disclosed herein.
Figure 22:
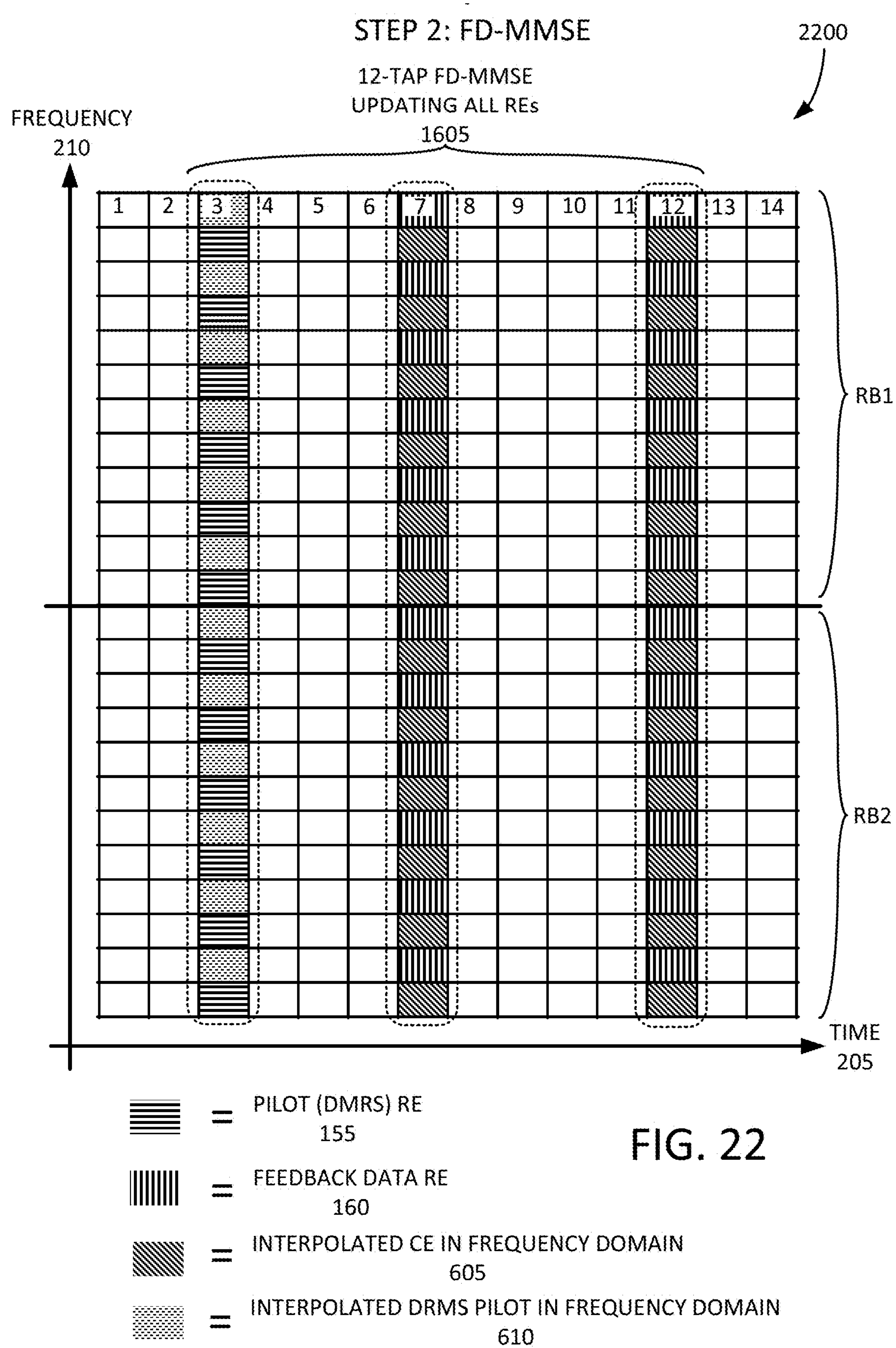
Figure 23:
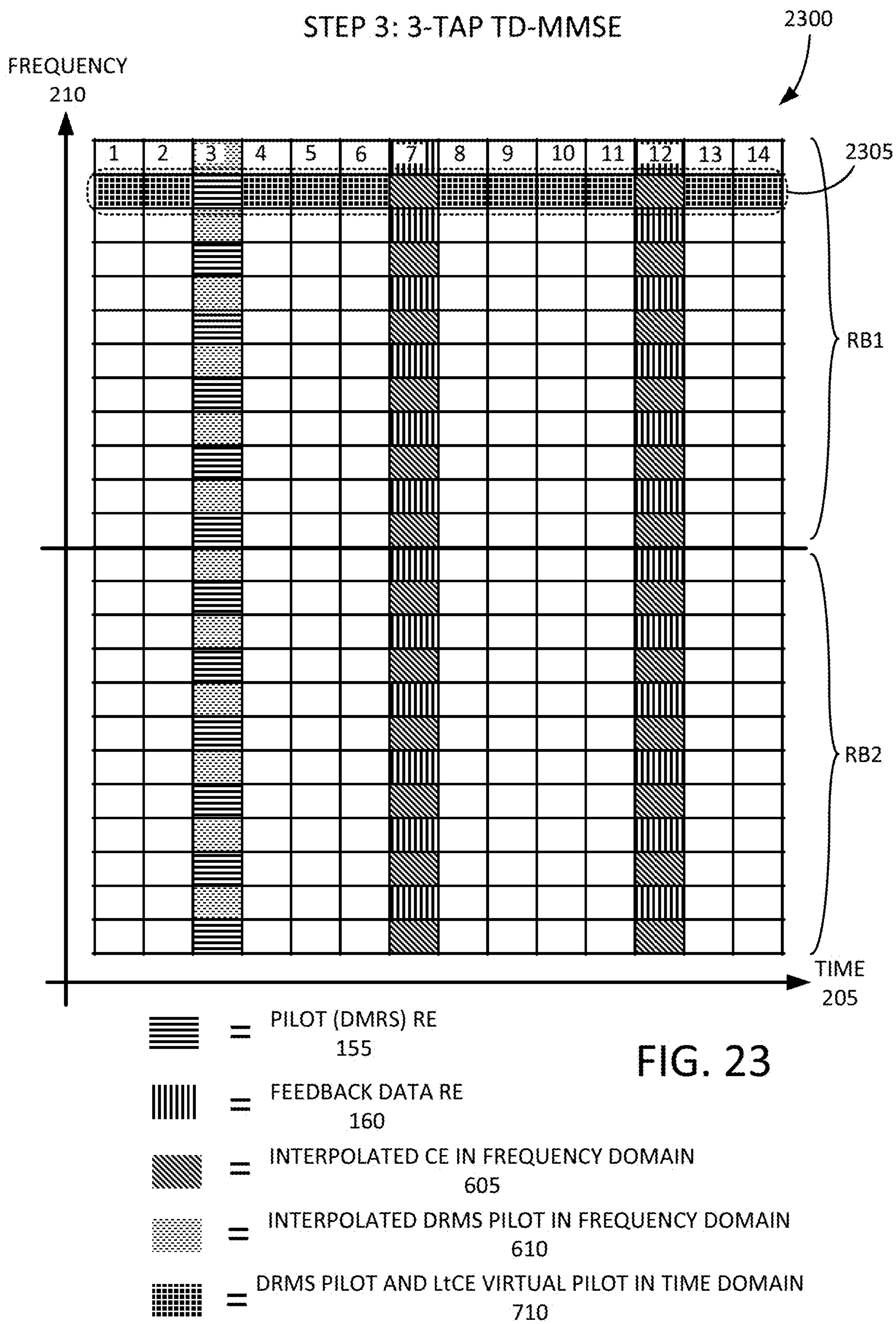
Figure 24:
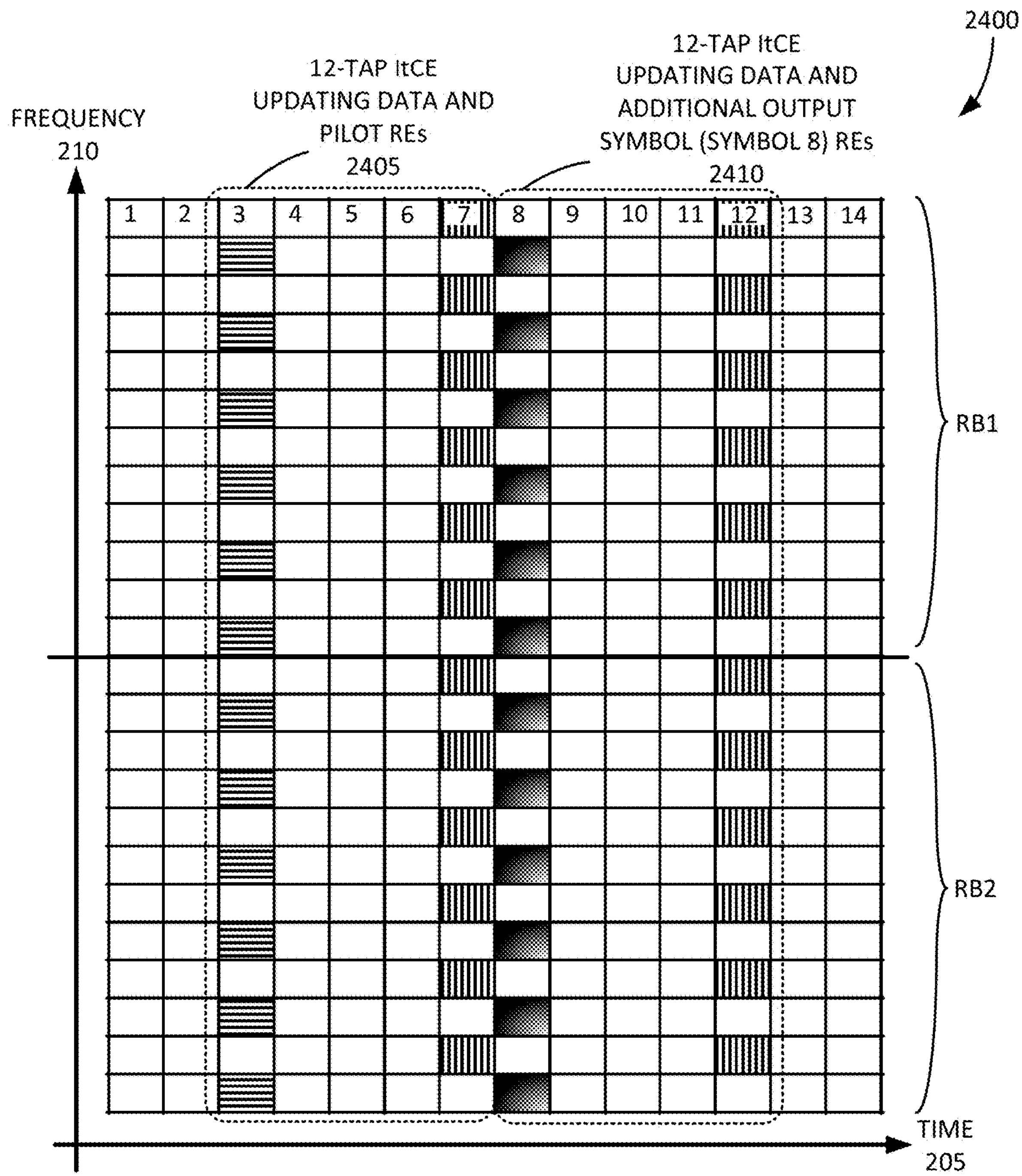
FIGS. 24-26 are example time-frequency diagrams showing still another RB bundling technique in accordance with some embodiments disclosed herein.
Figure 25:
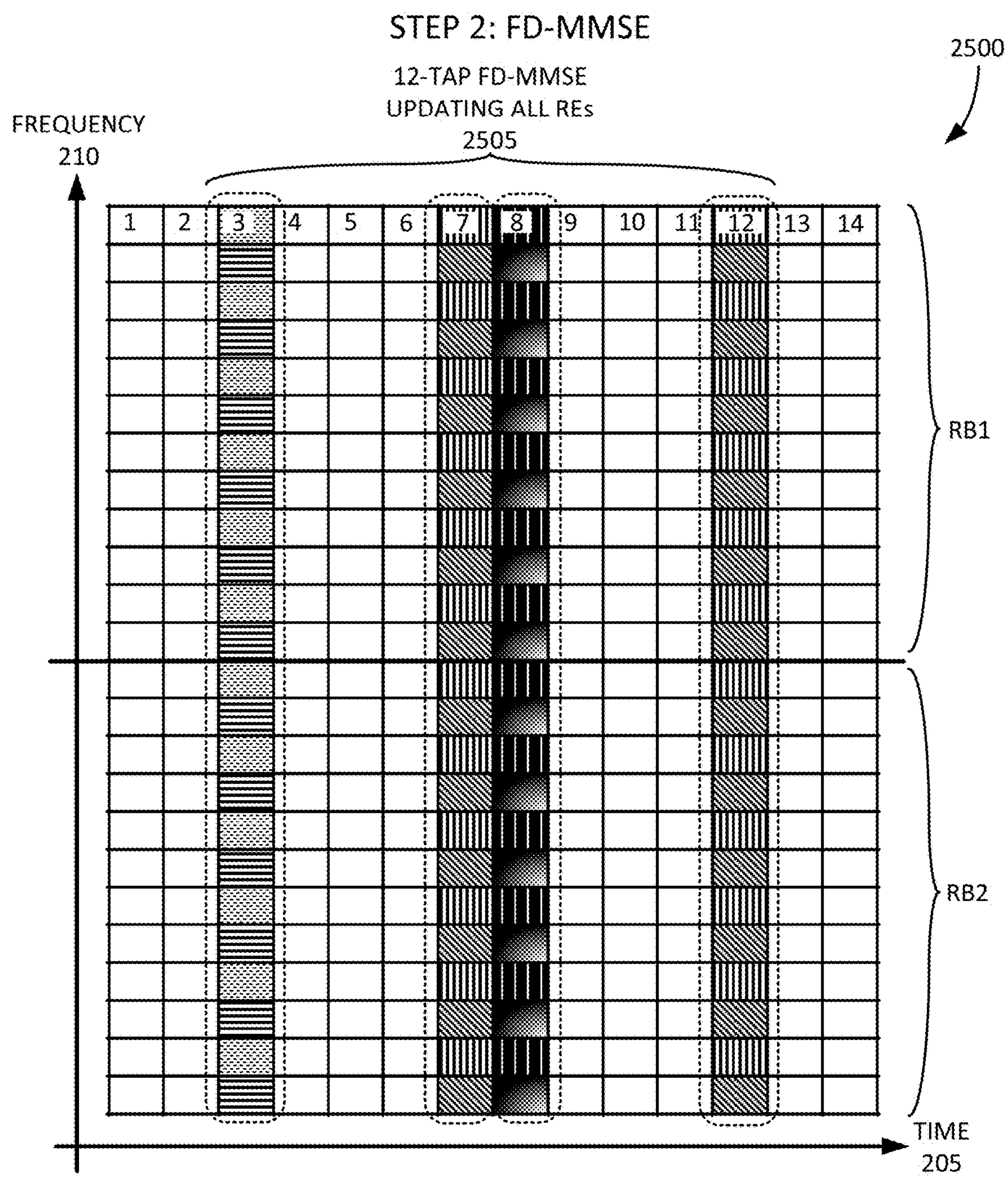
Figure 26:
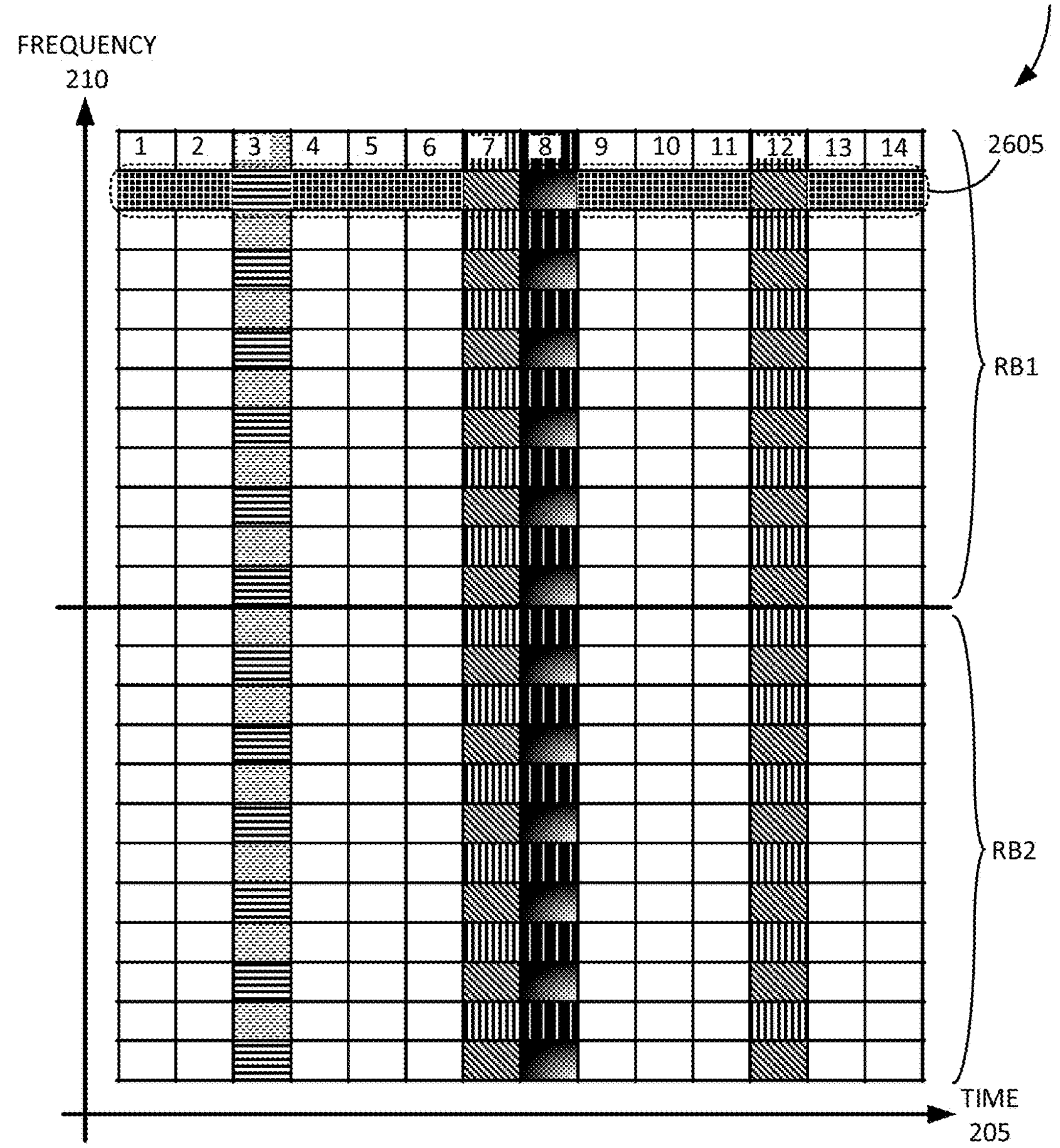

FIGS. 18-20 are example time-frequency diagrams 1800, 1900, 2000 showing another RB bundling technique in accordance with some embodiments disclosed herein. FIGS. 21-23 are example time-frequency diagrams 2100, 2200,

2300 showing yet another RB bundling technique in accordance with some embodiments disclosed herein. FIGS. 24-26 are example time-frequency diagrams 2400, 2500, 2600 showing still another RB bundling technique in accordance with some embodiments disclosed herein. Some of the elements and corresponding reference numerals shown in FIGS. 18-26 are described in detail above, and therefore, a detailed description of such elements is not necessarily repeated. For technique 3 and technique 4, since there are two data symbols and only one pilot symbol, there are not two separated (pilot, data) pairs in the Step 1 of the two DMRS symbols case. Three different approaches for step 1 in the single DMRS symbols case can be provided.

- Technique 3, Step 1, Approach 1: Update DMRS RE's CE only using data REs at data symbol 1. For example, data location [7,12] in FIG. 18. In step 1 as shown in FIG. 18, data and pilot REs are updated at 1805, and data REs are updated at 1810.
- Technique 3, Step 1, Approach 2: Update DMRS RE's CE twice using data REs at data symbol 1 and 2, respectively. And take the average of two updated channels at pilot symbols as the final updated channels at pilot symbols. For example, in FIG. 21, with data location [7,12]. In step 1, as shown in FIG. 21, data REs at symbol 1 and pilot REs are updated at 2110. In addition, data REs at symbol 2 and pilot REs are updated at 2115. Two updated CEs 2105 can be averaged into one pilot RE 155.
- Technique 3, Step 1, Approach 3: Update DMRS RE's CE only using data REs 160 at data symbol 1. Update some RE's CEs (e.g., same single carrier (SC) location of DMRS RE SC) at additional output pilot symbol using data REs 160 at data symbol 2. For example, in FIG. 24, with data location [7,12] and additional output 2415 at symbol 8. In step 1 as shown in FIG. 24, data and pilot REs are updated at 2405, and data and additional output symbol (symbol 8) REs are updated at 2410.

Referring to FIG. 19, step 2 includes updating all REs at 1905. Referring to FIG. 20, step 3 includes a 3-tap TD-MMSE interpolation as shown at 2005.

Referring to FIG. 22, step 2 includes updating all REs at 1605. Referring to FIG. 23, step 3 includes a 3-tap TD-MMSE interpolation as shown at 2305.

Referring to FIG. 25, step 2 includes updating all REs at 2505. The sections 2420 that have thick vertical lines represent the additional output 2415 interpolated in the frequency domain. Referring to FIG. 26, step 3 includes a 4-tap TD-MMSE interpolation as shown at 2605.

In some embodiments, 2RB ItCE techniques with single DMRS symbols can be used: four ItCE reduced complexity techniques for 2RB joint processing with single DMRS symbols are explained herein, and the examples for technique 1 and technique 3 are illustrated in FIGS. 15-26.

- Data symbols' location and/or RE patterns can be flexible and optimized.
- For physical resource block (PRB) bundle size of 4, a sliding window (e.g., windows size=2RB) with 2RB processing can be taken.

Some embodiments described herein include an iterative CE algorithm with phase noise for FR2. In an NR FR2 environment, a noise floor from phase noise (PN) can be higher due to higher carrier frequency, which makes the handling of at least common phase noise (CPE) important. To address PN in the FR2 environment, techniques disclosed herein can be used. The overall procedures including additional PN compensations for handling CPE with iterative CE can be described in the following pseudo-code steps:

- Step 0: Apply phase rotation in the input to address CPE.
- Step 1: Apply ItCE for each target data symbol.
- Step 2: Apply FDI if necessary depending on the chosen technique.
- Step 3: Apply TDI considering phase difference in each OFDM symbol.

As in the above steps, phase pre-rotation (i.e., step 0) can additionally be performed, and three different methods are presented as follows:

Method 1: the technique described in the previous section can be valid under no appearance of phase noise. Referring back to the original ItCE update equation from the equation (10): note that as in previous derivations, the received symbols or channels e.g., $\hat{h}_l^{pilot}$, $y^{data}$, and $\hat{d}_l^{pilot}$ indicate CPE-free samples. Let $\theta_h$, $\theta_d$ be the CPE value corresponding to the OFDM symbol where h and d are located at, respectively. In order to include the CPE in the existing equations, the original ItCE update equation can be written as:

$$
\begin{aligned}
e^{j\theta_h}\hat{h}_l &= e^{j\theta_h}\hat{h}_l^{pilot} + \tilde{R}_{hd}\left(\tilde{R}_{dd} + \sigma^2\left(\left(\sum\nolimits_l^{(i)}\right)^{-1}\right)\right)^{-1} e^{j\theta_h}\left(\left(\sum\nolimits_l^{(i)}\right)^{-1}\left(M_l^{(i)}\right)^H y^{data} - \hat{d}_l^{pilot}\right) \\
&\approx e^{j\theta_h}\hat{h}_l^{pilot} + \tilde{R}_{hd}\left(\tilde{R}_{dd} + \alpha\sigma^2 I\right)^{-1}\text{diag}\left(\tilde{R}_{dd} + \alpha\sigma^2 I\right)\left[\text{diag}\left(\tilde{R}_{dd} + \sigma^2\left(\sum\nolimits_l^{(i)}\right)^{-1}\right)\right]^{-1} \\
&\quad \cdot e^{j(\theta_h-\theta_d)}\underbrace{\left(\left(\sum\nolimits_l^{(i)}\right)^{-1}\left(M_l^{(i)}\right)^H e^{j\theta_d} y^{data} - e^{j\theta_d}\hat{d}_l^{pilot}\right)},
\end{aligned}
\tag{27}
$$

where $e^{j\theta_h}\hat{h}_l^{pilot}$, $e^{j\theta_d}y^{data}$, and $e^{j\theta_d}\hat{d}_l^{pilot}$ represent the CPE-containing samples that are actual inputs to the ItCE block. This technique can indicate that we can directly use the CPE-containing symbols along with phase rotation for ItCE. Also, this indicates the rotation of filter input (i.e., underbraced part, the result of $$
\left(\sum\nolimits_l^{(i)}\right)^{-1}\left(M_l^{(i)}\right)^H e^{j\theta_d} y^{data} - e^{j\theta_d}\hat{d}_l^{pilot}\right)
$$

by $e^{j(\theta_h-\theta_d)}$. This also can generate CPE-including channel output. The rotation is not necessary when $\theta_h=\theta_d$, i.e., when the target OFDM symbol and feedback OFDM symbol are the same (e.g., techniques 1 and 2). A traditional time domain interpolation architecture can handle the phase difference of the two anchor symbols. So, only the phase rotations of the inputs are newly added.

Method 2: this method seeks to reduce the complexity of method 1. Notice that the underbraced part in equation (27) is a function of the reception (Rx) antenna, hence requiring different phase rotation for each Rx antenna. A solution is to rotate the underbraced term in equation (28), which need not depend on the Rx antenna. Accordingly, this can provide a complexity saving—in other words, a reduction in complexity.

$$e^{j\theta_h}\hat{h}_l \approx e^{j\theta_h}\hat{h}_l^{pilot} + \tilde{R}_{hd}\left(\tilde{R}_{dd} + \alpha\sigma^2 I\right)^{-1}\text{diag}\left(\tilde{R}_{dd} + \alpha\sigma^2 I\right)e^{j(\theta_h-\theta_d)} \underbrace{\left[\text{diag}\left(\tilde{R}_{dd} + \sigma^2\left(\sum\nolimits_l^{(i)}\right)^{-1}\right)\right]^{-1}} \cdot \left(\left(\sum\nolimits_l^{(i)}\right)^{-1}\left(M_l^{(i)}\right)^H e^{j\theta_d} y^{data} - e^{j\theta_d}\hat{d}_l^{pilot}\right). \tag{28}$$

The insertion of $e^{j(\theta_h-\theta_d)}$ ahead of an underbraced term indicates that the rotation is applied to the underbraced term. It will be understood that this method can be mathematically equivalent to method 1, but the objective of this method is to reduce complexity by rotating the underbraced correlation matrix.

Method 3: this method seeks to handle CPE in the ItCE filter coefficient calculations, which can be written as:

$$e^{j\theta_h}\hat{h}_l \approx e^{j\theta_h}\hat{h}_l^{pilot} + e^{j(\theta_h-\theta_d)}\underbrace{\tilde{R}_{hd}}\left(\tilde{R}_{dd} + \alpha\sigma^2 I\right)^{-1} \text{diag}\left(\tilde{R}_{dd} + \alpha\sigma^2 I\right)\left[\text{diag}\left(\tilde{R}_{dd} + \sigma^2\left(\sum\nolimits_l^{(i)}\right)^{-1}\right)\right]^{-1} \cdot \left(\left(\sum\nolimits_l^{(i)}\right)^{-1}\left(M_l^{(i)}\right)^H e^{j\theta_d} y^{data} - e^{j\theta_d}\hat{d}_l^{pilot}\right). \tag{29}$$

The location of $e^{j(\theta_h-\theta_d)}$ ahead of $\tilde{R}_{hd}$ indicates that the phase rotation is done to the correlation matrix $\tilde{R}_{hd}$, which can be the same in every precoding resource block group (PRG) for a given h and d location within a PRG, which can provide significant complexity savings. It will be understood that this method can also be mathematically equivalent to method 1 and/or method 2, but the objective of method 3 is to reduce complexity by rotating the underbraced correlation matrix. This rotation can be done in software and/or hardware because the correlation can be pre-calculated.

The number of rotations is now calculated and compared for each method. Assume approach 3, type-1 DMRS, one-symbol DMRS, N PRGs of size 2 PRB. Let $N_f$, $N_r$, L be the number of feedback OFDM symbols, number of Rx antenna, and number of layers, respectively. Then, the number of additional rotations for handling PN becomes:

TABLE 1

Comparison of complexity of Method 1-3

| Method 1 | Method 2 | Method 3 |
|---|---|---|
| None for techniques 1 & 2<br>$N \times 12 \times N_f \times N_r \times L$ for techniques 3 & 4 | None for techniques 1 & 2<br>$N \times 12 \times N_f \times L$ for techniques 3 & 4 | None for techniques 1 & 2<br>$12 \times 12 \times N_f$ for technique 3<br>$24 \times 12 \times N_f$ for technique 4 |

Figure 27:
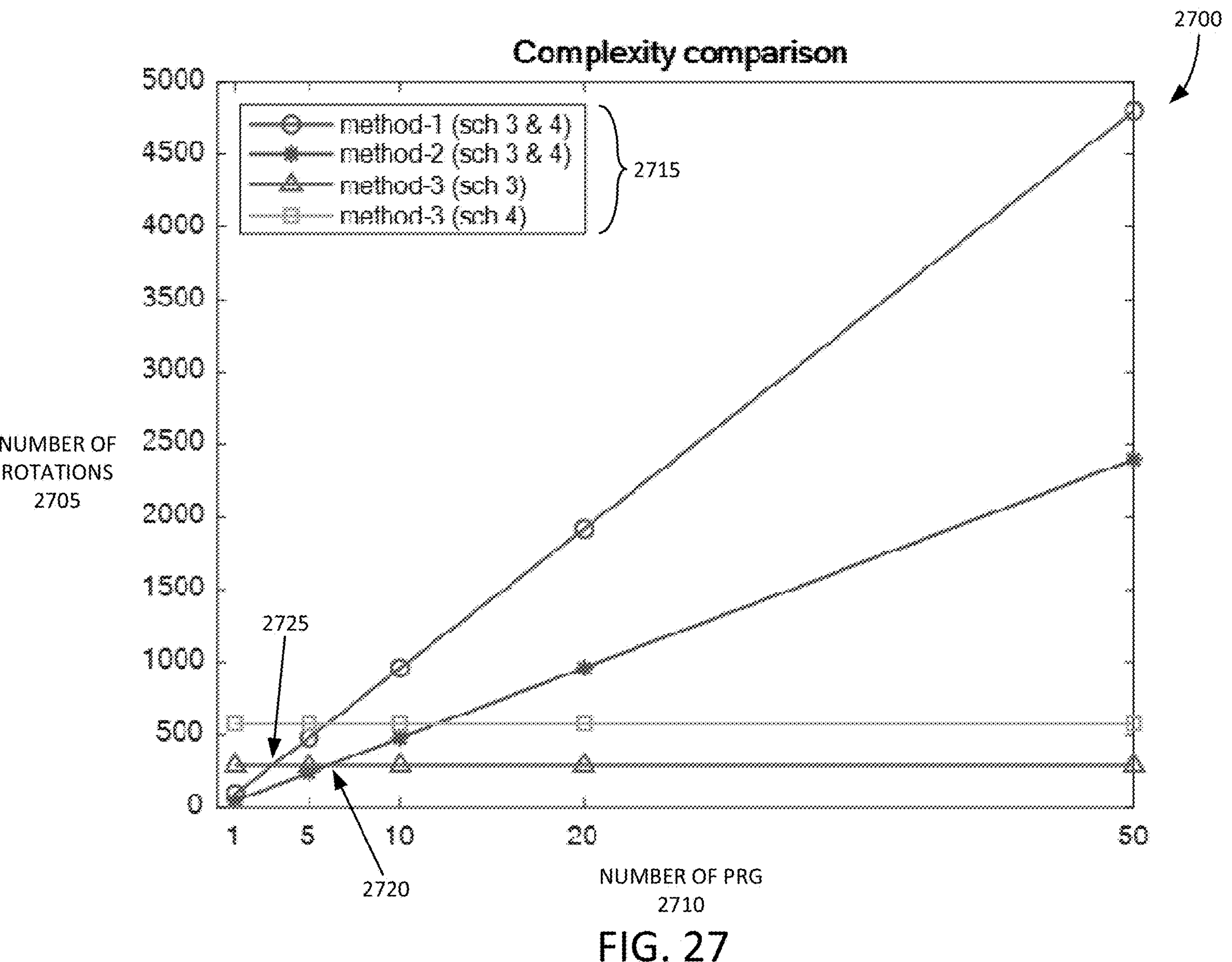
FIG. 27 is a plot diagram showing a complexity comparison for PN handling including a number of rotations for three different methods of phase pre-rotation in accordance with some embodiments disclosed herein.

FIG. 27 is a plot diagram 2700 showing complexity comparison for PN handling including a number of rotations for three different methods of phase pre-rotation in accordance with some embodiments disclosed herein. The Y-axis shows the number of rotations 2705. The X-axis shows the number of PRG 2710. A key is provided at 2715 showing the techniques used in the plot diagram for each method. For example, when $N_f$=2, $N_r$=2, L=2, the number of rotations are plotted in FIG. 27. Method 3 can provide large savings in most cases because the correlation matrix in a PRG is invariant to the bandwidth. The FIG. 27 shows crossing points (i.e., 2720, 2725) where the advantage of method 1 or 2 can be seen (i.e., where there can be small bandwidth). For technique 3 disclosed herein, comparing with method 3, around <3 PRG, method 1 has lower complexity, and around <6 PRG, method 2 has lower complexity.

Some embodiments disclosed herein include phase noise handling with ItCE techniques: the ItCE techniques disclosed herein can work together with common phase noise compensation. The pseudo code for handling common phase noise with the disclosed ItCE algorithm can be found above in the pseudo-code steps 0, 1, 2, and 3. Three methods (i.e., Method 1, Method 2, and Method 3) for additional phase rotation in step 0 are disclosed above.

Figure 28:
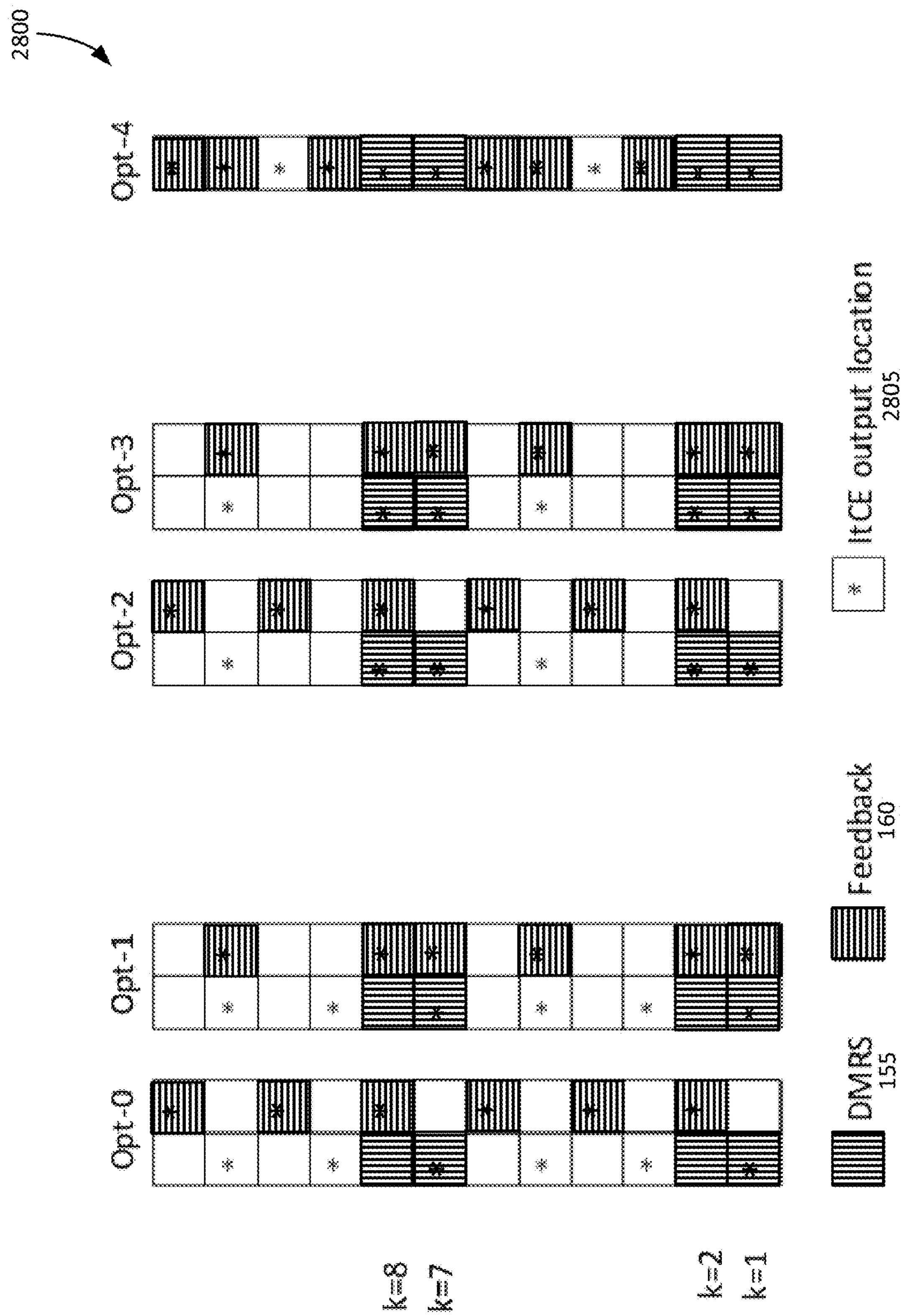
FIG. 28 is a diagram showing different options for DMRS, feedback, and ItCE output locations in ItCE for Type-2 DMRS in accordance with some embodiments disclosed herein.

Some embodiments disclosed herein include iterative CE processing for Type-2 DMRS: in the above sections, the descriptions for the disclosed ItCE techniques implicitly assume Type-1 DMRS. All techniques can be similarly applied to Type-2 DMRS. FIG. 28 is an example diagram 2800 showing different options (e.g., Opt-0, Opt-1, Opt-2, Opt-3, and Opt-4) for DMRS 155, feedback 160, and ItCE output locations 2805 in ItCE for Type-2 DMRS in accordance with some embodiments disclosed herein. It will be understood that these are just examples, and other locations for feedback and output locations are possible. The feedback data RE locations and ItCE output locations can be further optimized.

In this case, due to its different locations of the DMRS 155, the feedback 160 and the ItCE output locations 2805 can be different. The same pattern can be repeated if another DMRS symbol exists in a slot.

Some embodiments disclosed herein include iterative CE with DMRS Type-2: the disclosed ItCE technique can work with Type-2 DMRS. The locations of the feedback data REs 160 and ItCE output locations 2805 can be further optimized for type-2 DMRS. Opt-0 in FIG. 28 shows one of the possible patterns, which is preferable due to its superior performance.

Alternatives for iterative CE: in this section, variations of the Iterative CE are disclosed.

I. ItCE Feedback Variations

When calculating the matrices associated with soft-mean and soft variance $\Sigma_l^{(i)}$ and $M_l^{(i)}$, an APP can be used from decoding output. Two alternatives can be considered. First, the APP from the detector output can be used. This can have a lower quality feedback than the decoder output, but the overall latency can be reduced since it is not necessary to wait for the decoding process to be finished. $\Sigma_l^{(i)}$ and $M_l^{(i)}$ can be also be replaced by the hard feedback symbol from the decoder or detector. Hard feedback symbols can include the Quadrature Amplitude Modulation (QAM) symbols acquired by taking the hard-decision on the detector or decoder APP LLRs. So the equations (7) (8) can be replaced with equations (30) (31). In some embodiments, this is the preferred approach since the hard-decision may be easier to implement than a soft-mean and/or variance calculation.

$$\sum\nolimits_l^{(i)} \stackrel{\text{def}}{=} \hat{X}_l^H \hat{X}_l, \tag{30}$$

$$M_l^{(i)} \stackrel{\text{def}}{=} \hat{X}_l \tag{31}$$

Some hybrid feedback techniques combining soft and hard feedback can also be considered. For example, this can be conditioned on the associated code block-cyclic redundancy check (CB-CRC) (i.e., CRC of the code block where the feedback is located). Use hard feedback when the corresponding CB-CRC is passed, otherwise use soft feedback (e.g., APP LLRs without a hard decision). Additional linear scaling factor can be applied to the LLR feedback.

This technique can be used in IDD-only techniques, and can yield performance gains in certain scenarios.

For the disclosed ItCE algorithm, the soft feedback from the decoder output can be replaced by the following alternatives:

Use APP from detector to calculate soft feedback.

Use hard feedback from decoder (or detector).

Hybrid technique: used hard feedback when associated CB-CRC is passed, use soft feedback otherwise.

Consider LLR scaling in the soft feedback for all soft (i.e., APP from decoder or detector) or hybrid techniques.

II. ItCE Data Feedback Locations Alternatives

The data feedback patterns considered in previous section can be fixed in time and/or frequency locations. In practice, these can be even more flexible. For example, a different number of symbols and number of SC can be used for different channel conditions to achieve better performance complexity trade-off. Also, the channel coding in NR can be segmented into a number of CBs with associated CRCs, and/or the data feedback location can be dynamically optimized based on the CB CRC feedback. For example, feedback RE's can be selected from a neighborhood symbol if the corresponding CB-CRC passed (e.g., and the CB-CRC of the pre-configured RE locations is failed).

Some embodiments disclosed herein include ItCE data feedback location alternatives: for the disclosed ItCE algorithm, the following data feedback locations (e.g., number of SC, number of symbols, number of total REs) variations can be used:

The data feedback locations can be optimized based on scenarios: for example, based on channel conditions, Multiple-Input Multiple-Output (MIMO) configurations, and/or or Modulation Coding Scheme (MCS), etc.

The selection of data feedback OFDM symbol locations can consider the quality of feedback or the distance to DMRS symbols. For example, they can be the nearest OFDM symbol to DMRS between two DMRS symbols or on DMRS symbols.

The data feedback locations can be adjusted depending on the quality of feedback. For example, it may depend on the instantaneous CB CRC from the decoder output.

III. ItCE with Multiple Iterations

The concept of ItCE showing in FIG. 1 may only run one ItCE iteration once, i.e., iterates the CE->SymbDet->SymbDec procedure with updated SymbDec output. However, multiple ItCE iterations can be run if the complexity is allowed.

Some embodiments disclosed herein include ItCE with multiple iterations: for the disclosed ItCE algorithm, multiple iterations can be performed. The number of iterations can be:

A fixed number.

Optimized according to different scenarios (channel, MIMO configurations, MCS, etc.).

Dynamically determined—i.e., it can depend on the feedback, LLRs 135, etc.

Dependent on a system resource (available memory, computation power, etc.).

IV. ItCE Techniques with Different Options of FD-MMSE and TD-MMSE

In the disclosed ItCE techniques, the FD-MMSE and TD-MMSE can be used as part of the operations. In LMMSE interpolation/extrapolation of the form $h_{all}=Wh_{input}$ (where $h_{input}$ is a subset of $h_{all}$), the filter can update the elements corresponding to $h_{input}$, because in general the LMMSE weight matrix W need not contain an identity sub-matrix. This can be the procedure applied in pilot CE for FD-MMSE and TD-MMSE.

In ItCE, when FD-MMSE and TD-MMSE interpolation are applied, the following two options can be used:

Update input REs, similar to the pilot CE procedure. This option can be referred to as "smoothing."

Do not update input REs and only update the interpolated REs. This option can be referred to as "interpolation-only."

The "interpolation-only" option can be used because ItCE output can already account for FD and TD correlations, through matrices $R_{hp}$, $R_{dp}$, so updating these REs again in TD or FD interpolation means applying the correlations twice. On the other hand, "smoothing" may be preferable because it avoids discontinuities in the output.

Some embodiments disclosed herein can include FD-MMSE/TD-MMSE options in ItCE techniques: the following two options can be used when FD-MMSE and TD-MMSE interpolation are applied in ItCE techniques:

Smoothing: update all output REs, including input REs (similar to the pilot CE procedure).

Interpolation-only: do not update input REs and only update the interpolated REs.

V. ItCE Techniques with Joint Data Symbol Processing

In the disclosed ItCE techniques, such as the technique 1 to technique 4 in jointed 2RB processing, two data symbols can be processed separately in order to limit $N_D=12$ for matrix inversion complexity. Alternatively, if complexity is not an issue, joint processing can be performed on the two data symbols (e.g., which can involve $N_D=24$).

Some embodiments disclosed herein can include ItCE techniques with joint data symbol processing: in the disclosed ItCE techniques, joint data symbol processing (i.e., instead of separated data symbol processing) can be used.

VI. ItCE with SNR Offset Under ISI Channel

In an OFDM system, a channel with long delay spread (DS) that is longer than CP length can introduce inter-symbol interference (ISI). Therefore, the effective SNR seen by Rx processing can be negatively impacted. Accordingly, using the configured SNR as it is may not accurately indicate the current channel conditions. One way to combat this effect is to apply intentional offset to the SNR value used for CE filter calculation. In other words, the SNR value used for CE can become "SNR+offset."

The order of offset changes at different SNR can be taken into account. This can indicate that a fixed offset may not be the optimal choice across all SNR range, which is reasonable because the SNR reduction due to ISI can be different at different SNR. For example, at high SNR, the noise can become smaller, and therefore the impact of ISI can become more prominent.

Some embodiments disclosed herein can include ItCE with SNR offset under ISI channel: in the disclosed ItCE techniques, "SNR+offset" can be used to calculate the CE filters to combat with ISI channel, where the value of offset can be a constant or can depend on the SNR region.

VII. Different Expression of $W_{hp}$ and $W_{dp}$ in Sequential Form of ItCE

In the derivation of the sequential form of ItCE, $W_{hp}$ and $W_{dp}$ can be obtained from the true correlation matrices, $R_{hp}$ and $R_{dp}$. Since the correlations between h (or d) and p can involve both TD and FD correlation, the expressions of $W_{hp}$ (12) and $W_{dp}$ (15) can implicitly assume that pilot-based CE is performed by a 2D (i.e., jointly TD and FD) MMSE filter. In fact, such implicit assumption comes from the derivation of data-aided MMSE/EM-MAP, where full 2D correlation matrices have been applied.

While some receivers can support 2D MMSE CE in certain scenarios, the MMSE CE can be split into two steps: first an FD-MMSE step to obtain channel estimates on DMRS symbols, and then a TD-MMSE step to obtain channel estimates for all remaining symbols. To account for a 1D+1D (i.e., separate TD and FD) structure of pilot CE, the expressions of $W_{hp}$ and $W_{dp}$ can be modified by expressing the combination of FD-MMSE and TD-MMSE (e.g., both of which can be linear operations) in a matrix form.

Let $N_P^{TD}$ the number of pilot (DMRS) symbols in a slot, and $N_P^{FD}$ the number of pilot (DMRS) subcarriers per symbol within the considered RB bundle, so that $N_P=N_P^{TD}N_P^{FD}$. Let us rewrite $y^{pilot}$ as:

$$y^{pilot} = \begin{bmatrix} y_1^{pilot} \\ \vdots \\ y_{N_P^{TD}}^{pilot} \end{bmatrix} \tag{32}$$

where $y_n^{pilot} \in \mathbb{C}^{N_P^{FD}\times 1}$ for $n \in \{1, \ldots, N_P^{TD}\}$. Similarly, we denote by $p_n^{FD} \in \mathbb{C}^{N_P^{FD}\times 1}$ the channel on the pilot locations for symbol n, by $p_k^{TD} \in \mathbb{C}^{N_P^{TD}\times 1}$ the channel on the pilot symbols for subcarrier k, and by $C_0^{FD}$, $C_1^{FD}$ the corresponding FD-OCC matrices of size $N_P^{FD}\times N_P^{FD}$.

For a subcarrier $k \in \{1, \ldots, N_P^{FD}\}$ and layer l, the output of FD-MMSE for all $N_P^{TD}$ symbols can be written as:

$$\hat{h}_{l,k}^{FD} = \underbrace{\begin{bmatrix} w_{l,k}^{FD} & \ldots & 0 \\ \vdots & \ddots & \vdots \\ 0 & \ldots & w_{l,k}^{FD} \end{bmatrix}}_{\overset{def}{=} \tilde{W}_{l,k}^{FD}} \underbrace{\begin{bmatrix} y_1^{pilot} \\ \vdots \\ y_{N_P^{TD}}^{pilot} \end{bmatrix}}_{= y^{pilot}} \in \mathbb{C}^{N_P^{TD}\times 1} \tag{33}$$

where $$w_{l,k}^{FD} \overset{def}{=} R_{h_k p^{FD}} C_l^{FD} \left( C_0^{FD} R_{p^{FD} p^{FD}} C_0^{FD} + C_1^{FD} R_{p^{FD} p^{FD}} C_1^{FD} + \sigma^2 I \right)^{-1} \in \mathbb{C}^{1\times N_P^{FD}}. \tag{34}$$

In the expression above, the symbol index in $p^{FD}$ can be omitted since the subcarrier locations are the same for all symbols, and similarly, layer and symbol index in $h_k$ can be omitted since the FD correlation only depends on subcarrier index k. The size of $\tilde{W}_{l,k}^{FD}$ can be $N_P^{TD}\times N_P$.

The contribution of TD-MMSE can be considered. For layer l, subcarrier k, and symbol j, the channel estimate after TD-MMSE can be written as:

$$\hat{h}_{l,k,j}^{pilot,FD+TD} = \underbrace{R_{h_j p^{TD}} \left( R_{p^{TD} p^{TD}} + \sigma_{FD-MMSE}^2 I \right)^{-1}}_{\overset{def}{=} w_j^{TD}} \hat{h}_{l,k}^{FD} \tag{35}$$

$$= w_j^{TD} \tilde{W}_{l,k}^{FD} y^{pilot} \tag{36}$$

where $w_j^{TD} \in \mathbb{C}^{N_P^{TD}\times 1}$ is the TD-MMSE filter for the j-th symbol, $\sigma_{FD-MMSE}^2$ is the resulting noise variance after FD-MMSE denoising, and the subcarrier index in $p^{TD}$ has been omitted as well as the layer and subcarrier index in $h_j$ since TD correlation only depends on symbol index j.

Then, the effective 1D+1D pilot CE filter, for layer l, subcarrier k and symbol j, can be given by:

$$w_{l,k,j} \overset{def}{=} w_j^{TD} \tilde{W}_{l,k}^{FD} \in \mathbb{C}^{1\times N_P} \tag{37}$$

which can be, in general, different from the 2D MMSE filter expression. For sequential ItCE (10), $w_{l,j,k}$ (37) can be used to replace the 2D form of $W_{hp}$ (12) and $W_{dp}$ (15), thus resulting in different matrices $\tilde{R}_{dd}$ and $\tilde{R}_{hd}$. The motivation for using the 1D+1D expression (37) is that it reflects the processing done by pilot CE; however, the 2D expression can reflect the actual correlations more precisely. The 1D+1D expression need not perform better than the 2D form even when the pilot CE is based on 1D+1D operations.

Some embodiments disclosed herein can include different expression of $W_{hp}$ and $W_{dp}$ in sequential form of ItCE: if pilot-based CE in 1st iteration is based on 1D+1D MMSE operations (separated FD-MMSE and TD-MMSE steps), 1D+1D expression (37) can replace the 2D form of $W_{hp}$ (12) and $W_{dp}$ (15).

VIII. ItCE Combined with Non-MMSE-Based Pilot CE in 1st Iteration

In the derivation of sequential ItCE, MMSE type pilot CE can be assumed to be used in the 1st iteration ($\hat{h}_l^{pilot}$ and $\hat{d}_l^{pilot}$). In a receiver with non-MMSE type pilot CE, the same ItCE sequential form (10) can be used when the CE in the following iterations is updated. This is one type of model mismatch and the modified sequential data-aided EM-MAP equation can be used with β scaling (17) instead. Additional ItCE gains can be generally observed even when CE at the 1st iteration is not a MMSE-based CE (e.g., it can be machine learning type CE).

Some embodiments disclosed herein can include ItCE with non-MMSE pilot-based CE: in a receiver with non-MMSE type pilot CE in 1st iteration, the same sequential data-aided EM-MAP ItCE (10) can be used. By treating this as a model mismatch, the modified sequential data-aided EM-MAP ItCE with β scaling (17) can also be used.

Figure 29:
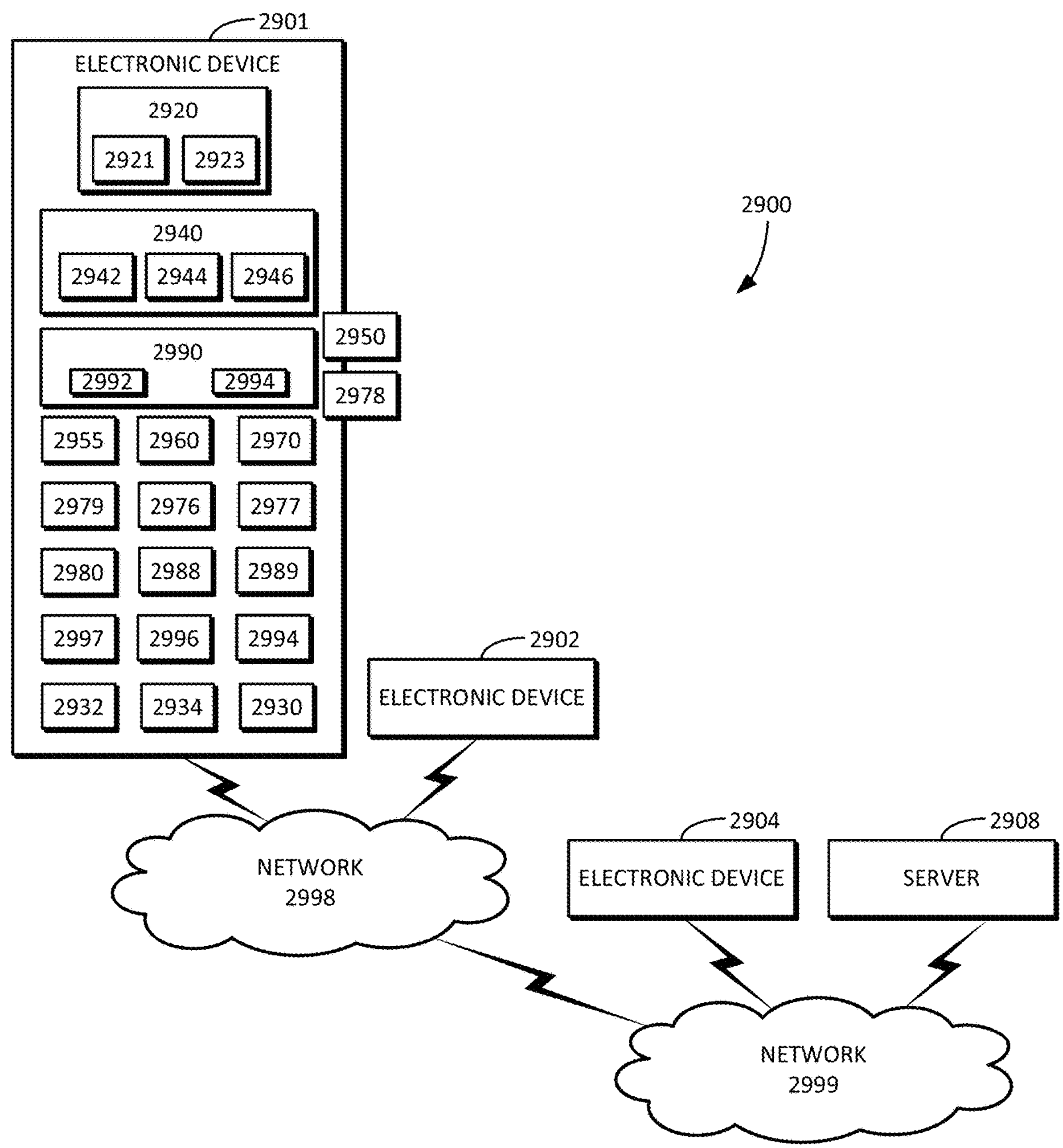
FIG. 29 is a block diagram of an electronic device in a network environment, according to an embodiment.

FIG. 29 is a block diagram of an electronic device in a network environment 2900, according to an embodiment. Referring to FIG. 29, an electronic device 2901 in a network environment 2900 may communicate with an electronic device 2902 via a first network 2998 (e.g., a short-range wireless communication network), or an electronic device 2904 or a server 2908 via a second network 2999 (e.g., a long-range wireless communication network). The electronic device 2901 may communicate with the electronic device 2904 via the server 2908. The electronic device 2901 may include a processor 2920, a memory 2930, an input device 2940, a sound output device 2955, a display device 2960, an audio module 2970, a sensor module 2976, an interface 2977, a haptic module 2979, a camera module 2980, a power management module 2988, a battery 2989, a communication module 2990, a subscriber identification module (SIM) card 2996, or an antenna module 2994. In one embodiment, at least one (e.g., the display device 2960 or the camera module 2980) of the components may be omitted from the electronic device 2901, or one or more other components may be added to the electronic device 2901. Some of the components may be implemented as a single integrated circuit (IC). For example, the sensor module 2976 (e.g., a fingerprint sensor, an iris sensor, or an illuminance sensor) may be embedded in the display device 2960 (e.g., a display).

The processor 2920 may execute software (e.g., a program 2940) to control at least one other component (e.g., a hardware or a software component) of the electronic device 2901 coupled with the processor 2920 and may perform various data processing or computations.

As at least part of the data processing or computations, the processor 2920 may load a command or data received from another component (e.g., the sensor module 2946 or the communication module 2990) in volatile memory 2932, process the command or the data stored in the volatile memory 2932, and store resulting data in non-volatile memory 2934. The processor 2920 may include a main processor 2921 (e.g., a central processing unit (CPU) or an application processor (AP)), and an auxiliary processor 2923 (e.g., a graphics processing unit (GPU), an image signal processor (ISP), a sensor hub processor, or a communication processor (CP)) that is operable independently from, or in conjunction with, the main processor 2921. Additionally or alternatively, the auxiliary processor 2923 may be adapted to consume less power than the main processor 2921, or execute a particular function. The auxiliary processor 2923 may be implemented as being separate from, or a part of, the main processor 2921.

The auxiliary processor 2923 may control at least some of the functions or states related to at least one component (e.g., the display device 2960, the sensor module 2976, or the communication module 2990) among the components of the electronic device 2901, instead of the main processor 2921 while the main processor 2921 is in an inactive (e.g., sleep) state, or together with the main processor 2921 while the main processor 2921 is in an active state (e.g., executing an application). The auxiliary processor 2923 (e.g., an image signal processor or a communication processor) may be implemented as part of another component (e.g., the camera module 2980 or the communication module 2990) functionally related to the auxiliary processor 2923.

The memory 2930 may store various data used by at least one component (e.g., the processor 2920 or the sensor module 2976) of the electronic device 2901. The various data may include, for example, software (e.g., the program 2940) and input data or output data for a command related thereto. The memory 2930 may include the volatile memory 2932 or the non-volatile memory 2934.

The program 2940 may be stored in the memory 2930 as software, and may include, for example, an operating system (OS) 2942, middleware 2944, or an application 2946.

The input device 2950 may receive a command or data to be used by another component (e.g., the processor 2920) of the electronic device 2901, from the outside (e.g., a user) of the electronic device 2901. The input device 2950 may include, for example, a microphone, a mouse, or a keyboard.

The sound output device 2955 may output sound signals to the outside of the electronic device 2901. The sound output device 2955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2960 may visually provide information to the outside (e.g., a user) of the electronic device 2901. The display device 2960 may include, for example, a display, a hologram device, or a projector and control circuitry to control a corresponding one of the display, hologram device, and projector. The display device 2960 may include touch circuitry adapted to detect a touch, or sensor circuitry (e.g., a pressure sensor) adapted to measure the intensity of force incurred by the touch.

The audio module 2970 may convert a sound into an electrical signal and vice versa. The audio module 2970 may obtain the sound via the input device 2950 or output the sound via the sound output device 2955 or a headphone of an external electronic device 2902 directly (e.g., wired) or wirelessly coupled with the electronic device 2901.

The sensor module 2976 may detect an operational state (e.g., power or temperature) of the electronic device 2901 or an environmental state (e.g., a state of a user) external to the electronic device 2901, and then generate an electrical signal or data value corresponding to the detected state. The sensor module 2976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2977 may support one or more specified protocols to be used for the electronic device 2901 to be coupled with the external electronic device 2902 directly (e.g., wired) or wirelessly. The interface 2977 may include, for example, a high-definition multimedia interface (HDMI), a universal serial bus (USB) interface, a secure digital (SD) card interface, or an audio interface.

A connecting terminal 2978 may include a connector via which the electronic device 2901 may be physically connected with the external electronic device 2902. The connecting terminal 2978 may include, for example, an HDMI connector, a USB connector, an SD card connector, or an audio connector (e.g., a headphone connector).

The haptic module 2979 may convert an electrical signal into a mechanical stimulus (e.g., a vibration or a movement) or an electrical stimulus which may be recognized by a user via tactile sensation or kinesthetic sensation. The haptic module 2979 may include, for example, a motor, a piezoelectric element, or an electrical stimulator.

The camera module 2980 may capture a still image or moving images. The camera module 2980 may include one or more lenses, image sensors, image signal processors, or flashes. The power management module 2988 may manage power supplied to the electronic device 2901. The power management module 2988 may be implemented as at least part of, for example, a power management integrated circuit (PMIC).

The battery 2989 may supply power to at least one component of the electronic device 2901. The battery 2989 may include, for example, a primary cell which is not rechargeable, a secondary cell which is rechargeable, or a fuel cell.

The communication module 2990 may support establishing a direct (e.g., wired) communication channel or a wireless communication channel between the electronic device 2901 and the external electronic device (e.g., the electronic device 2902, the electronic device 2904, or the server 2908) and performing communication via the established communication channel. The communication module 2990 may include one or more communication processors that are operable independently from the processor 2920 (e.g., the AP) and supports a direct (e.g., wired) communication or a wireless communication. The communication module 2990 may include a wireless communication module 2992 (e.g., a cellular communication module, a short-range wireless communication module, or a global navigation satellite system (GNSS) communication module) or a wired communication module 2994 (e.g., a local area network (LAN) communication module or a power line communication (PLC) module). A corresponding one of these communication modules may communicate with the external electronic device via the first network 2998 (e.g., a short-range communication network, such as Bluetooth™, wireless-fidelity (Wi-Fi) direct, or a standard of the Infrared Data Association (IrDA)) or the second network 2999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2992 may identify and authenticate the electronic device 2901 in a communication network, such as the first network 2998 or the second network 2999, using subscriber information (e.g., international mobile subscriber identity (IMSI)) stored in the subscriber identification module 2996.

The antenna module 2997 may transmit or receive a signal or power to or from the outside (e.g., the external electronic device) of the electronic device 2901. The antenna module 2997 may include one or more antennas, and, therefrom, at least one antenna appropriate for a communication technique used in the communication network, such as the first network 2998 or the second network 2999, may be selected, for example, by the communication module 2990 (e.g., the wireless communication module 2992). The signal or the power may then be transmitted or received between the communication module 2990 and the external electronic device via the selected at least one antenna.

Commands or data may be transmitted or received between the electronic device 2901 and the external electronic device 2904 via the server 2908 coupled with the second network 2999. Each of the electronic devices 2902 and 2904 may be a device of a same type as, or a different type, from the electronic device 2901. All or some of operations to be executed at the electronic device 2901 may be executed at one or more of the external electronic devices 2902, 2904, or 2908. For example, if the electronic device 2901 should perform a function or a service automatically, or in response to a request from a user or another device, the electronic device 2901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 2901. The electronic device 2901 may provide the outcome, with or without further processing of the outcome, as at least part of a reply to the request. To that end, a cloud computing, distributed computing, or client-server computing technology may be used, for example.

A processor (e.g., 2920) can control a symbol processing block, which can be configured to generate one or more a posteriori LLRs. The processor can control a CE module configured to receive the one or more a posteriori LLRs from the symbol processing block, and to process ItCE for new NR. Some embodiments disclosed herein include a system, including a symbol processing block configured to generate one or more LLRs associated with one or more data symbols. The system can further include a CE module configured to receive the one or more LLRs from the symbol processing block, and to process ItCE for NR based at least on one or more reference signals and the one or more LLRs. In some embodiments, the CE module is configured to process the ItCE with a granularity of one or more RBs based at least on one or more pilot REs and one or more virtual pilot REs obtained from the one or more LLRs. In some embodiments, the CE module is configured to process the ItCE based at least on an FD-OCC structure of the one or more reference signals. In some embodiments, the one or more reference signals are DMRS signals configured in 5G NR.

In some embodiments, the CE module is configured to process the ItCE by updating a CE result by adding a quantity that represents a contribution obtained from one or more virtual pilot REs. In some embodiments, the CE module is configured to process the ItCE in accordance with an update rule as follows:

$$\hat{h}_l = \hat{h}_l^{pilot} + \beta\tilde{R}_{hd}\left(\tilde{R}_{dd} + \sigma^2\left(\sum\nolimits_l^{(i)}\right)^{-1}\right)^{-1}\left(\left(\sum\nolimits_l^{(i)}\right)^{-1}\left(M_l^{(i)}\right)^H y^{data} - K_l^{(i)}\hat{d}_l^{pilot}\right),$$

wherein:

i) $\hat{h}_l$ represents an updated output of the ItCE;

ii) $\hat{h}_l^{pilot}$ represents an initial CE output;

iii) $y^{data}$ represents a vector of a received signal on the one or more virtual pilot REs;

iv) $\hat{d}_l^{pilot}$ represents an initial CE output for layer l on the one or more virtual pilot REs;

v) $\tilde{R}_{hd}$ and $\tilde{R}_{dd}$ represent matrices derived from channel correlation matrices associated with at least one of i) a number or ii) one or more locations of the one or more virtual pilot REs, associated with one or more output REs, and associated with an FD-OCC structure of the one or more reference signals;

vi) $\Sigma_l^{(i)}$, $M_l^{(i)}$, and $K_l^{(i)}$ represent matrices associated with at least one of i) the one or more virtual pilot REs, ii) the one or more LLRs, or iii) one or more normalizations;

vii) $\beta$ represents a scaling parameter; and viii) $\sigma^2$ represents a noise parameter.

In some embodiments, a matrix inversion is approximated by $$\tilde{R}_{hd}\left(\tilde{R}_{dd} + \sigma^2\left(\sum\nolimits_l^{(i)}\right)^{-1}\right)^{-1} \approx \tilde{R}_{hd}\left(\tilde{R}_{dd} + \alpha\sigma^2 I\right)^{-1}\underbrace{\text{diag}\left(\tilde{R}_{dd} + \alpha\sigma^2 I\right)\left[\text{diag}\left(\tilde{R}_{dd} + \sigma^2\left(\sum\nolimits_l^{(i)}\right)^{-1}\right)\right]^{-1}}_{scaling\ per\ RE}$$

wherein $\alpha$ is a scaling parameter.

In some embodiments, the CE module is configured to calculate the noise parameter $\sigma^2$ using a LUT based on a quantization of a measured SNR, adjusted with an additional at least one of i) a positive offset or ii) a negative offset in dB. In some embodiments, the ItCE is configured to reduce complexity for at least one of i) one or more FR1 scenarios, ii) one or more FR2 scenarios, or iii) one or more reference signal patterns. In some embodiments, the ItCE is configured to vary a position of the one or more data symbols used as one or more virtual pilot REs. In some embodiments, the ItCE is configured to vary one of more output locations of the ItCE. In some embodiments, the ItCE is configured to vary one or more interpolations and corresponding processing orders.

In some embodiments, the CE module is configured to process the ItCE by applying a sliding window in a frequency domain, wherein a window size associated with the sliding window is one or more RBs in a frequency direction and the one or more data symbols in a time direction. In some embodiments, the CE module is configured to improve a performance level of the ItCE using sequential soft-interference cancellation to handle multiple layers. In some embodiments, the CE module is configured to reduce PN for FR2, receive one or more input signals, apply a phase rotation to the one or more input signals, and apply the ItCE for the one or more data symbols.

In some embodiments, the CE module is configured to apply one or more interpolations based on at least one of i) FDI or ii) TDI. In some embodiments, the CE module is configured to apply the one or more interpolations to at least one of i) one or more outputs of the ItCE, ii) a mixture of the one or more outputs of the ItCE and one or more outputs of CE, or iii) one or more outputs of one or more already-used interpolations. In some embodiments, the CE module is configured to process the ItCE on a predefined frequency-domain pattern of at least one of i) one or more pilot REs or ii) one or more virtual pilot REs, for one or more OFDM symbols, with one or more outputs of the ItCE that includes the at least one of i) the one or more pilot REs or ii) the one or more virtual pilot REs. In some embodiments, the CE module is configured to interpolate the one or more outputs of the ItCE in a frequency domain by the FDI on each of the one or more OFDM symbols. In some embodiments, the CE module is configured to interpolate one or more outputs of the FDI of the one or more OFDM symbols in a time domain by the TDI.

In some embodiments, the CE module is configured to process the ItCE on a predefined frequency-domain pattern of at least one of i) one or more pilot REs or ii) one or more virtual pilot REs, for one or more OFDM symbols, with one or more outputs of the ItCE that includes all subcarriers corresponding to the one or more OFDM symbols. In some embodiments, the CE module is configured to interpolate the one or more outputs of the ItCE of the one or more OFDM symbols in a time domain by the TDI.

In some embodiments, the symbol processing block is configured to provide one or more hard feedback symbols, wherein the one or more hard feedback symbols include one or more modulated symbols. In some embodiments, the CE module is configured to process the ItCE based at least on the one or more hard feedback symbols. In some embodiments, the CE module is configured to perform a preprocessing operation to additionally scale the one or more LLRs received from the symbol processing block. In some embodiments, the symbol processing block is configured to provide one or more hard feedback symbols. In some embodiments, the one or more hard feedback symbols include one or more modulated symbols. In some embodiments, based on a CB-CRC passing, the CE module is configured to process at least one of i) the ItCE based at least on the one or more hard feedback symbols, or ii) the ItCE based on soft feedback.

In some embodiments, the CE module is configured to process the ItCE for a number of iterations. In some embodiments, the number of iterations are determined based on at least one of i) a fixed number, ii) a channel status, iii) one or more antenna configurations, iv) a modulation order, v) a feedback quality of the symbol processing block, or vi) available memory and computation power. In some embodiments, the CE module is configured to process the ItCE in combination with machine learning-based CE by updating one or more results of the machine learning-based CE by adding a quantity that represents a contribution obtained from the one or more virtual pilot REs.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

The invention claimed is:

1. A system, comprising:

a symbol processing block configured to generate one or more log likelihood ratios (LLRs) associated with one or more data symbols; and a channel estimation (CE) module configured to receive the one or more LLRs from the symbol processing block, and to process iterative CE (ItCE) for new radio (NR) based at least on one or more reference signals and the one or more LLRs, wherein:

the symbol processing block is configured to provide one or more hard feedback symbols;

the one or more hard feedback symbols include one or more modulated symbols; and based on a code block-cyclic redundancy check (CB-CRC) passing, the CE module is configured to process at least one of i) the ItCE based at least on the one or more hard feedback symbols, or ii) the ItCE based on soft feedback.

2. The system of claim 1, wherein the CE module is configured to process the ItCE with a granularity of one or more resource blocks (RBs) based at least on one or more pilot resource elements (REs) and one or more virtual pilot REs obtained from the one or more LLRs.

3. The system of claim 1, wherein the CE module is configured to process the ItCE based at least on a frequency domain orthogonal cover codes (FD-OCC) structure of the one or more reference signals.

4. The system of claim 1, wherein the one or more reference signals are demodulation reference signals (DMRS) configured in 5G NR.

5. The system of claim 1, wherein the CE module is configured to process the ItCE by updating a CE result by adding a quantity that represents a contribution obtained from one or more virtual pilot REs.

6. The system of claim 1, wherein:

the ItCE is configured to reduce complexity for at least one of i) one or more frequency range 1 (FR1) scenarios, ii) one or more frequency range 2 (FR2) scenarios, or iii) one or more reference signal patterns;

the ItCE is configured to vary a position of the one or more data symbols used as one or more virtual pilot REs;

the ItCE is configured to vary one of more output locations of the ItCE; and the ItCE is configured to vary one or more interpolations and corresponding processing orders.

7. The system of claim 1, wherein the CE module is configured to process the ItCE by applying a sliding window in a frequency domain, wherein a window size associated with the sliding window is one or more RBs in a frequency direction and the one or more data symbols in a time direction.

8. The system of claim 1, wherein the CE module is configured to improve a performance level of the ItCE using sequential soft-interference cancellation to handle multiple layers.

9. The system of claim 1, wherein the CE module is configured to:

reduce phase noise (PN) for FR2;

receive one or more input signals;

apply a phase rotation to the one or more input signals; and apply the ItCE for the one or more data symbols.

10. The system of claim 1, wherein:

the CE module is configured to apply one or more interpolations based on at least one of i) frequency domain interpolation (FDI) or ii) time domain interpolation (TDI); and the CE module is configured to apply the one or more interpolations to at least one of i) one or more outputs of the ItCE, ii) a mixture of the one or more outputs of the ItCE and one or more outputs of CE, or iii) one or more outputs of one or more already-used interpolations.

11. The system of claim 10, wherein the CE module is configured to:

process the ItCE on a predefined frequency-domain pattern of at least one of i) one or more pilot REs or ii) one or more virtual pilot REs, for one or more orthogonal frequency division multiplexing (OFDM) symbols, with one or more outputs of the ItCE that includes the at least one of i) the one or more pilot REs or ii) the one or more virtual pilot REs;

interpolate the one or more outputs of the ItCE in a frequency domain by the FDI on each of the one or more OFDM symbols; and interpolate one or more outputs of the FDI of the one or more OFDM symbols in a time domain by the TDI.

12. The system of claim 10, wherein the CE module is configured to:

process the ItCE on a predefined frequency-domain pattern of at least one of i) one or more pilot REs or ii) one or more virtual pilot REs, for one or more OFDM symbols, with one or more outputs of the ItCE that includes all subcarriers corresponding to the one or more OFDM symbols; and interpolate the one or more outputs of the ItCE of the one or more OFDM symbols in a time domain by the TDI.

13. The system of claim 1, wherein:

the symbol processing block is configured to provide the one or more hard feedback symbols; and the CE module is configured to process the ItCE based at least on the one or more hard feedback symbols.

14. The system of claim 1, wherein the CE module is configured to perform a preprocessing operation to additionally scale the one or more LLRs received from the symbol processing block.

15. The system of claim 1, wherein:

the CE module is configured to process the ItCE for a number of iterations; and the number of iterations are determined based on at least one of i) a fixed number, ii) a channel status, iii) one or more antenna configurations, iv) a modulation order, v) a feedback quality of the symbol processing block, or vi) available memory and computation power.

16. The system of claim 1, wherein the CE module is configured to process the ItCE in combination with machine learning-based CE by updating one or more results of the machine learning-based CE by adding a quantity that represents a contribution obtained from one or more virtual pilot REs.

17. A system, comprising:

a symbol processing block configured to generate one or more log likelihood ratios (LLRs) associated with one or more data symbols; and a channel estimation (CE) module configured to receive the one or more LLRs from the symbol processing block, and to process iterative CE (ItCE) for new radio (NR) based at least on one or more reference signals and the one or more LLRs, wherein the CE module is configured to process the ItCE by updating a CE result by adding a quantity that represents a contribution obtained from one or more virtual pilot REs; and wherein the CE module is configured to process the ItCE in accordance with an update rule as follows:

$$\hat{h}_l = \hat{h}_l^{pilot} + \beta\tilde{R}_{hd}\left(\tilde{R}_{dd} + \sigma^2\left(\sum_l^{(i)}\right)^{-1}\right)^{-1}\left(\left(\sum_l^{(i)}\right)^{-1}\left(M_l^{(i)}\right)^H y^{data} - K_l^{(i)}\hat{d}_l^{pilot}\right),$$

wherein:

i) $\hat{h}_l$ represents an updated output of the ItCE;

ii) $\hat{h}_l^{pilot}$ represents an initial CE output;

iii) $y^{data}$ represents a vector of a received signal on the one or more virtual pilot REs;

iv) $\hat{d}_l^{pilot}$ represents an initial CE output for layer l on the one or more virtual pilot REs;

v) $\tilde{R}_{hd}$ and $\tilde{R}_{dd}$ represent matrices derived from channel correlation matrices associated with at least one of i) a number or ii) one or more locations of the one or more virtual pilot REs, associated with one or more output REs, and associated with an FD-OCC structure of the one or more reference signals;

vi) $\Sigma_l^{(i)}$, $M_l^{(i)}$, and $K_l^{(i)}$ represent matrices associated with at least one of i) the one or more virtual pilot REs, ii) the one or more LLRs, or iii) one or more normalizations;

vii) $\beta$ represents a scaling parameter; and viii) $\sigma^2$ represents a noise parameter.

18. The system of claim 17, wherein a matrix inversion is approximated by $$\tilde{R}_{hd}\left(\tilde{R}_{dd} + \sigma^2\left(\sum_l^{(i)}\right)^{-1}\right)^{-1} \approx \tilde{R}_{hd}\left(\tilde{R}_{dd} + \alpha\sigma^2 I\right)^{-1}\underbrace{\text{diag}\left(\tilde{R}_{dd} + \alpha\sigma^2 I\right)\left[\text{diag}\left(\tilde{R}_{dd} + \sigma^2\left(\sum_l^{(i)}\right)^{-1}\right)\right]^{-1}}_{scaling\ per\ RE}$$

wherein $\alpha$ is a scaling parameter.

19. The system of claim 17, wherein the CE module is configured to calculate the noise variance parameter $\sigma^2$ using a look-up-table (LUT) based on a quantization of a measured signal-to-noise-ratio (SNR) in decibel (dB), adjusted with an additional at least one of i) a positive offset or ii) a negative offset.

* * * * *